United States Patent
Chen et al.

(10) Patent No.: US 12,477,038 B2
(45) Date of Patent: Nov. 18, 2025

(54) DATA ACCESS SYSTEM AND METHOD, DEVICE, AND NETWORK ADAPTER

(71) Applicant: HUAWEI TECHNOLOGIES CO., LTD., Guangdong (CN)

(72) Inventors: Can Chen, Chengdu (CN); Fanlu Jiang, Chengdu (CN); Qiming Xu, Chengdu (CN); Zhaojiao Han, Shenzhen (CN); Bowei Yu, Chengdu (CN); Jianye Yao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/485,942

(22) Filed: Oct. 12, 2023

(65) Prior Publication Data
US 2024/0039995 A1     Feb. 1, 2024

Related U.S. Application Data

(63) Continuation of application No. PCT/CN2022/084322, filed on Mar. 31, 2022.

(30) Foreign Application Priority Data

Apr. 14, 2021    (CN) .......................... 202110399947.4
Jun. 23, 2021    (CN) .......................... 202110697375.8

(51) Int. Cl.
*H04L 67/1097*      (2022.01)
*G06F 13/28*      (2006.01)

(52) U.S. Cl.
CPC .......... *H04L 67/1097* (2013.01); *G06F 13/28* (2013.01); *G06F 2213/28* (2013.01)

(58) Field of Classification Search
CPC .................................................. H04L 67/1097
See application file for complete search history.

(56) References Cited

U.S. PATENT DOCUMENTS 7,783,788 B1 *   8/2010   Quinn .................. G06F 9/5077
                                                     711/170
10,831,386 B2 *   11/2020   Voigt .................... G06F 3/0688
(Continued)

FOREIGN PATENT DOCUMENTS

CN         103902486 A      7/2014
CN         103929415 A      7/2014
(Continued)

OTHER PUBLICATIONS

International Search Report and Written Opinion in International Appln. No. PCT/CN2022/084322, mailed on Jun. 16, 2022, 16 pages (with English translation).

(Continued)

*Primary Examiner* — Douglas B Blair
(74) *Attorney, Agent, or Firm* — Fish & Richardson P.C.

(57) ABSTRACT

In one example method, a client device sends a first packet to a first storage device, to request that target data can be written into the first storage device, where the first packet includes a logical address into which the target data needs to be written. A front-end network adapter of the first storage device has a capability of parsing the first packet, and can process the first packet. The front-end network adapter of the first storage device writes the target data into the first storage device based on an indication of the first packet. The front-end network adapter of the first storage device generates metadata, and records a correspondence between the logical address of the target data and the metadata, where the metadata can indicate a physical address at which the target data is stored in the first storage device.

20 Claims, 11 Drawing Sheets

(56) References Cited

U.S. PATENT DOCUMENTS

| | | | | |
|---|---|---|---|---|
| 10,877,922 | B2* | 12/2020 | Voigt | G06F 11/1004 |
| 11,089,105 | B1* | 8/2021 | Karumbunathan | G06F 16/275 |
| 2014/0012936 | A1* | 1/2014 | Aikoh | G06F 12/084 |
| | | | | 709/213 |
| 2014/0344488 | A1* | 11/2014 | Flynn | G06F 13/1673 |
| | | | | 710/52 |
| 2015/0261633 | A1 | 9/2015 | Usgaonkar et al. | |
| 2018/0188974 | A1* | 7/2018 | Cayton | G06F 3/0655 |
| 2018/0341429 | A1* | 11/2018 | Bolkhovitin | G06F 3/067 |
| 2018/0341547 | A1* | 11/2018 | Bolkhovitin | G06F 13/28 |
| 2018/0341548 | A1* | 11/2018 | Bolkhovitin | G06F 11/1068 |
| 2018/0341549 | A1* | 11/2018 | Bolkhovitin | G06F 11/1068 |
| 2019/0294339 | A1* | 9/2019 | Bolkhovitin | G06F 3/0607 |
| 2020/0133909 | A1 | 4/2020 | Hefty et al. | |
| 2020/0285591 | A1* | 9/2020 | Luo | G06F 16/144 |
| 2020/0320014 | A1* | 10/2020 | Luo | G06F 3/0644 |
| 2020/0326891 | A1* | 10/2020 | Luo | G06F 3/0688 |
| 2022/0113913 | A1* | 4/2022 | Niell | G06F 3/0659 |
| 2022/0400069 | A1* | 12/2022 | Xu | H04L 43/0829 |
| 2023/0409514 | A1* | 12/2023 | Bshara | H04L 67/1097 |

FOREIGN PATENT DOCUMENTS

| | | |
|---|---|---|
| CN | 103942087 A | 7/2014 |
| CN | 112204513 A | 1/2021 |

OTHER PUBLICATIONS

Extended European Search Report in European Appln. No. 22787387.4, mailed on Aug. 23, 2024, 7 pages.

EP Communication Pursuant to Article 94(3) EPC in European Appln. No. 22787387.4, mailed on Sep. 26, 2025, 8 pages.

* cited by examiner

| Operation code | Command identifier | NSID | Buffer address | Length | Target data | LBA | LUN |

FIG. 3C

DATA ACCESS SYSTEM AND METHOD, DEVICE, AND NETWORK ADAPTER

CROSS-REFERENCE TO RELATED APPLICATIONS

This application is a continuation of International Application No. PCT/CN2022/084322, filed on Mar. 31, 2022, which claims priority to Chinese Patent Application No. 202110399947.4, filed on Apr. 14, 2021, and Chinese Patent Application No. 202110697375.8, filed on Jun. 23, 2021. All of the aforementioned patent applications are hereby incorporated by reference in their entirety.

TECHNICAL FIELD

This application relates to the field of storage technologies, and in particular, to a data access system and method, a device, and a network adapter.

BACKGROUND

Currently, a client sends a data access request to a server according to a network protocol, to read or write data. For example, the data access request is for requesting to read data A. A processor of the server needs to find the data A from a memory, buffer the data A in an internal memory of the server, then encapsulate the data A in a data access response, and feed back the data access response to the client.

When processing the data access request, the processor of the server needs to perform data replication and encapsulation on the data A. It can be learned that, in a process in which the server processes the data access request, a large quantity of computing resources of the processor are occupied. As a result, read/write efficiency of an entire storage system of the server is poor.

SUMMARY

This application provides a data access system and method, a device, and a network adapter, to reduce consumption on a processor of a server in a data access process.

According to a first aspect, an embodiment of this application provides a data access system. The data access system includes a client device and a first storage device, and the first storage device is a device in a storage system. In the data access system, when the target data needs to be written, the client device may send a first packet to the first storage device, to request that the target data can be written into the first storage device. The first packet includes a logical address into which the target data needs to be written, that is, a logical address of the target data.

When the first packet arrives at the first storage device, a front-end network adapter of the first storage device first receives the first packet, and the front-end network adapter of the first storage device can process the first packet and write the target data into the first storage device. In a process of writing the target data, the front-end network adapter of the first storage device may further generate metadata, and record a correspondence between the logical address of the target data and the metadata, where the metadata indicates a physical address at which the target data is stored in the first storage device.

After writing the target data, the front-end network adapter of the first storage device may further feed back a data access response (in this case, the data access response may be understood as a data write response) to the client device, to indicate that the target data has been successfully written.

In this embodiment of this application, the first storage device may also be referred to as a first device for short. Similarly, another device in the storage system can be deduced by analogy. For example, a second storage device may also be referred to as a second device for short.

In the foregoing system, in a data access process, especially a data write process, a processor of the first storage device does not need to participate, but the front-end network adapter of the first storage device performs an entire data access operation, including writing the target data, generating the metadata, and creating or updating index information (the index information can indicate the correspondence between the metadata and the logical address of the target data), thereby reducing consumption of the processor to some extent, effectively reducing occupation of computing resources of the processor, and improving data write efficiency.

In a possible implementation, the first storage device further includes an internal memory, and the internal memory may store the index information. When recording the correspondence between the logical address of the target data and the metadata, the front-end network adapter of the first storage device may directly record the correspondence between the logical address of the target data and the metadata in the index information, for example, record the correspondence between the logical address of the target data and the metadata, or may record a correspondence between the logical address of the target data and an address of the metadata. Alternatively, the front-end network adapter of the first storage device may record the correspondence between the logical address of the target data and the metadata in the index information in an indirect manner. For example, the front-end network adapter of the first storage device may generate a key (key) based on the logical address of the target data, use the metadata or the address of the metadata as a value (value), and record the correspondence between the logical address of the target data and the metadata in a manner of recording a key-value pair.

In the foregoing system, the front-end network adapter of the first storage device can maintain the index information, and the processor does not need to maintain the index information, thereby further reducing occupation of the processor.

In a possible implementation, the front-end network adapter of the first storage device may parse a packet from the client device. A first packet is used as an example. After receiving the first packet, the first storage device may parse the first packet, remove some packet headers from the first packet, and obtain a data write command based on an RDMA protocol. Then, the data write command may be further parsed to obtain the logical address of the target data carried in the data write command.

According to the foregoing method, the front-end network adapter of the first storage device can perform complete parsing on the first packet, and can directly obtain the logical address that is of the target data and that is carried in the first packet, making it convenient to write the target data subsequently.

In a possible implementation, the packet from the client device, for example, the first packet, may be based on any one of the following protocols: IB, RoCE, and an iWARP.

In the foregoing system, the front-end network adapter of the first storage device is applicable to parse packets transmitted according to different protocols, thereby effectively extending application scenarios.

In a possible implementation, the data access system further includes the second storage device, and the front-end network adapter of the first storage device may further indicate the second storage device to perform mirrored storage, to store a copy of the target data in the second storage device. When indicating the second storage device to perform mirrored storage, the front-end network adapter of the first storage device may send a mirror data write command to the second storage device, where the mirror data write command is for requesting to write the copy of the target data, and the mirror data write command includes the copy of the target data and the logical address of the target data.

In the foregoing system, the front-end network adapter of the first storage device indicates the second storage device to perform mirrored storage, so that the second storage device can store the copy of the target data. Even if the target data stored in the first storage device is damaged or lost, the second storage device still stores the copy of the target data, thereby effectively ensuring reliability of the target data.

In a possible implementation, before indicating the second storage device to perform mirrored storage, the front-end network adapter of the first storage device needs to first determine a second storage device that has a mirror mapping relationship with the first storage device, where the mirror mapping relationship indicates that a correspondence exists between the first storage device and the second storage device. The mirror mapping relationship may be stored in the first storage device, or may be stored at a location at which the first storage device can obtain the mirror mapping relationship.

In the foregoing system, two storage devices that mirror each other are defined by the mirror mapping relationship, so that the first storage device can conveniently and quickly determine the second storage device that has the mirror mapping relationship with the first storage device.

In a possible implementation, a connection may be established between the first storage device and the second storage device through a switch network adapter. For example, the first storage device may include at least two switch network adapters, and the first storage device is connected to the second storage device through the at least two switch network adapters. On the second storage device side, the second storage device may also include switch network adapters, and a connection may be established between the switch network adapters of the first storage device and the switch network adapters of the second device. When sending the mirror data write command to the second storage device, the front-end network adapter of the first storage device may first select, based on a load balancing policy, a switch network adapter from the at least two switch network adapters in the first storage device, and then send the mirror data write command to a network adapter of the second storage device through the selected switch network adapter.

In the foregoing system, the first storage device includes at least two switch network adapters. When the first storage device interacts with the second storage device, information may be sent through different switch network adapters. In this way, information that needs to be exchanged between the first storage device and the second storage device is allocated to the different switch network adapters, thereby effectively improving data exchange efficiency. In addition, because the load balancing policy is adopted when a switch network adapter is selected, an amount of information allocated to each switch network adapter of the first storage device is basically the same, thereby further ensuring data exchange efficiency.

In a possible implementation, after the target data is written into the first storage device, the client device may further request the target data from the first storage device. For example, the client device may send a second packet to the first storage device to request to read the target data, where the second packet includes the logical address of the target data. After receiving the second packet, the front-end network adapter of the first storage device may obtain the metadata based on the logical address of the target data, and obtain the target data from the first storage device based on the metadata.

After obtaining the target data, the front-end network adapter of the first storage device may feed back, to the client device, a data access response that carries the target data (in this case, the data access response may be understood as a data read response).

In the foregoing system, in a data access process, for example, a data read process, the processor of the first storage device does not need to participate, but the front-end network adapter of the first storage device performs a data read operation, thereby effectively reducing consumption of the processor and improving data read efficiency.

In a possible implementation, after receiving the second packet, the front-end network adapter of the first storage device can parse the second packet to obtain the logical address that is of the target data and that is carried in the second packet. For example, after receiving the second packet, the front-end network adapter of the first storage device may parse the second packet to obtain a data read command based on the RDMA protocol, and then parse the data read command to obtain the logical address that is of the target data and that is carried in the data read command. The first packet is based on any one of the following protocols: the IB, the RoCE, and the iWARP.

In the foregoing system, the front-end network adapter of the first storage device can perform complete parsing on the second packet, and can directly obtain the logical address that is of the target data and that is carried in the second packet, making it convenient to read the target data subsequently.

In a possible implementation, before obtaining the metadata, the front-end network adapter of the first storage device may first perform home search to determine a home node of the target data. When it is determined that the home node of the target data is the first storage device, the metadata may be obtained based on the logical address of the target data.

In the foregoing system, the first storage device can determine the home node of the target data by home search, and obtain the metadata only after it is determined that the home node of the target data is the first storage device, to ensure that the target data can be successfully read subsequently.

In a possible implementation, the front-end network adapter of the first storage device and the switch network adapters of the first storage device may be deployed in a centralized manner, or may be deployed separately. A quantity of front-end network adapters and a quantity of switch network adapters are not limited in this application, and may be one or more.

In the foregoing system, a deployment manner of the front-end network adapter and the switch network adapters in the first storage device is flexible, and is applicable to different device structures.

According to a second aspect, an embodiment of this application provides a data access method. The method may be applied to a first storage device. For beneficial effects, refer to the related descriptions of the first aspect. Details are not described herein again. In the method, a front-end network adapter of the first storage device may receive a first packet from a client device, where the first packet is for requesting to write target data into the first storage device.

When the first packet arrives at the first storage device, the front-end network adapter of the first storage device first receives the first packet, and processes the first packet. The front-end network adapter of the first storage device may individually write the target data into the first storage device. In a process of writing the target data, metadata may be further generated, and a correspondence between a logical address of the target data and the metadata is recorded, where the metadata indicates a physical address at which the target data is stored in the first storage device.

After the front-end network adapter of the first storage device writes the target data, the front-end network adapter of the first storage device may further feed back a data access response to the client device, to indicate that the target data has been successfully written.

In a possible implementation, the front-end network adapter of the first storage device records the correspondence between the logical address of the target data and the metadata in various manners. For example, the front-end network adapter of the first storage device may directly record the correspondence between the logical address of the target data and the metadata in index information, for example, record the correspondence between the logical address of the target data and the metadata, or may record a correspondence between the logical address of the target data and an address of the metadata. For another example, the front-end network adapter of the first storage device may alternatively record the correspondence between the logical address of the target data and the metadata in the index information in an indirect manner. The front-end network adapter of the first storage device may generate a key (key) based on the logical address of the target data, use the metadata or the address of the metadata as a value (value), and record the correspondence between the logical address of the target data and the metadata in a manner of recording a key-value pair.

In a possible implementation, after receiving the first packet, the front-end network adapter of the first storage device may obtain the logical address of the target data from the first packet. For example, the front-end network adapter of the first storage device may first parse the first packet, obtain the data write command based on the RDMA protocol by paring the first packet, and parse the data write command to obtain the logical address that is of the target data and that is carried in the data write command.

In a possible implementation, the first packet is based on any one of the following protocols: IB, RoCE, and an iWARP.

In a possible implementation, the front-end network adapter of the first storage device may further indicate a second storage device to perform mirrored storage. For example, the front-end network adapter of the first storage device sends a mirror data write command to a network adapter of the second storage device, where the mirror data write command is for requesting to write a copy of the target data, and the mirror data write command includes the copy of the target data and the logical address of the target data.

In a possible implementation, before sending the mirror data write command to a second device (for example, a network adapter of the second device), the front-end network adapter of the first storage device may further determine the second device according to a mirror mapping relationship, where the mirror mapping relationship records a correspondence between the first storage device and the second device. After the second device is determined, the mirror data write command is sent to the second device.

In a possible implementation, the first storage device includes at least two switch network adapters, and the first storage device may be connected to the second device through the at least two switch network adapters. The front-end network adapter of the first storage device may select a switch network adapter from the at least two switch network adapters based on a load balancing policy, and then send the mirror data write command to the network adapter of the second device through the selected switch network adapter.

In a possible implementation, the front-end network adapter of the first storage device may further read the target data based on a request of the client device. For example, the front-end network adapter of the first storage device may receive a second packet from the client device, where the second packet is for requesting to read the target data. Then, the front-end network adapter of the first storage device may obtain the logical address of the target data from the second packet; obtain the metadata based on the logical address of the target data, where the metadata is for describing the physical address at which the target data is stored in the first storage device; and obtain the target data from the first storage device based on the metadata. The front-end network adapter of the first storage device may further feed back, to the client device, a data access response carrying the target data.

In a possible implementation, the front-end network adapter of the first storage device may also parse the second packet to obtain a data read command based on the RDMA protocol, and then parse the data read command based on the RDMA protocol to obtain the logical address that is of the target data and that is carried in the data read command.

The second packet is based on any one of the following protocols: the IB, the RoCE, and the iWARP.

In a possible implementation, before obtaining the metadata, the front-end network adapter of the first storage device may further perform home search, and determine, based on the logical address of the target data, that a home node of the target data is the first storage device.

In a possible implementation, the front-end network adapter of the first storage device and the switch network adapters of the first storage device may be deployed in a centralized manner. That is, a network adapter has both a function of the front-end network adapter and a function of the switch network adapter. Alternatively, the front-end network adapter of the first storage device and the switch network adapters of the first storage device may be separately deployed. That is, there are two different network adapters. One network adapter can interact with a front end such as the client device, which is a front-end network adapter. Another network adapter can interact with another device in the storage system, which is a switch network adapter.

According to a third aspect, an embodiment of this application provides a data access system. The data access system includes a client device and a first storage device. In the data access system, the first storage device may be used by the client device to read target data locally or from a second storage device.

When determining to read the target data, the client device may send a second packet to the first storage device to read the target data, where the second packet includes a logical address of the target data. It should be noted that, the target data herein may be the same as or different from the target data mentioned in the foregoing aspects.

If a storage system in which the first storage device is located includes only the first storage device, or the first storage device can manage all storage space in the storage system, the front-end network adapter of the first storage device may directly obtain metadata based on the logical address of the target data, and then obtain the target data from the first storage device based on the metadata. If the storage system in which the first storage device is located includes another device (for example, the second storage device) in addition to the first storage device, or the first storage device can manage only a part of storage space in the storage system, the first storage device may perform home search. When it is determined that the home node of the target data is the first storage device, the metadata is obtained based on the logical address of the target data, and then the target data is obtained from the first storage device based on the metadata. After obtaining the target data, the front-end network adapter of the first storage device may feed back, to the client device, a data access response carrying the target data.

According to the foregoing method, in a data read process, the front-end network adapter of the first storage device may replace a processor of the first storage device to perform a data read operation. In the data read process, computing resources of the processor does not need to be occupied, and data read efficiency can also be improved.

In a possible implementation, the first storage device includes an internal memory, and the internal memory stores index information. If the index information records a correspondence between the logical address of the target data and the metadata in a direct manner, the front-end network adapter of the first storage device may directly obtain the metadata based on the logical address of the target data. If the index information records the correspondence between the logical address of the target data and the metadata in an indirect manner, for example, records the correspondence between the logical address of the target data and the metadata in a manner of a key-value pair, when obtaining the metadata, the front-end network adapter of the first storage device may first obtain a key of the target data based on the logical address of the target data, and then query, based on the key, the index information for a value corresponding to the key, where the value is the metadata or an address of the metadata.

According to the foregoing method, the front-end network adapter of the first storage device can obtain the metadata in different manners, making it convenient to read the target data subsequently.

In a possible implementation, the front-end network adapter of the first storage device has a packet parsing capability. After receiving the second packet, the front-end network adapter can parse the second packet, obtain the data read command based on the RDMA protocol by parsing the second packet, and then parse the data read command to obtain the logical address that is of the target data and that is carried in the data read command.

In the foregoing system, the front-end network adapter of the first storage device can perform complete parsing on the second packet, and can directly obtain the logical address that is of the target data and that is carried in the second packet, making it convenient to read the target data subsequently.

In a possible implementation, the second packet may be a packet based on any one of the following protocols: IB, RoCE, and an iWARP.

In a possible implementation, if the front-end network adapter of the first storage device determines that a home node of the target data is the second storage device, the front-end network adapter of the first storage device needs to obtain the target data from the second storage device. The front-end network adapter of the first storage device may forward the data read command to a network adapter of the second storage device.

According to the foregoing method, after determining that the home node is another node, the first storage device may obtain the target data from the another node, to ensure that the target data can be successfully fed back to the client device.

In a possible implementation, the first storage device includes at least two switch network adapters, and the first storage device may be connected to the second storage device through the at least two switching devices. When forwarding the data read command, the front-end network adapter of the first storage device may select a switch network adapter from the at least two switch network adapters based on a load balancing policy, and send the data read command to the network adapter of the second device through the selected switch network adapter.

According to the foregoing method, the first storage device may be connected to the second storage device through the at least two switching devices, to ensure that the first storage device and the second storage device can perform an efficient data exchange, thereby improving data exchange efficiency.

In a possible implementation, the front-end network adapter of the first storage device and the switch network adapters of the first storage device may be deployed in a centralized manner, or may be deployed separately. A quantity of front-end network adapters and a quantity of switch network adapters are not limited in this application, and may be one or more.

According to a fourth aspect, an embodiment of this application provides a network adapter. The network adapter is located in a storage device, and the network adapter includes a first protocol acceleration module, an index acceleration module, and a read/write module. The modules in the network adapter can cooperate to implement the method performed by the front-end network adapter in the second aspect. For beneficial effects, refer to the foregoing descriptions. Details are not described herein again.

The first protocol acceleration module may parse a data write command, where the data write command is for requesting to write target data; and obtain a logical address of the target data from the data write command. The read/write module may write the target data into the storage device. The index acceleration module may generate metadata, and record a correspondence between the logical address of the target data and the metadata, where the metadata describes a physical address at which the target data is stored in the storage device.

In a possible implementation, the network adapter further includes a second protocol acceleration module. After the network adapter receives a first packet from the client device, the second protocol acceleration module parses the first packet, and obtains the data write command from the first packet. The data write command is based on an RDMA protocol, and the first packet is based on IB, RoCE, or an iWARP.

In a possible implementation, the index acceleration module may be configured to maintain index information, where the index information indicates the correspondence between the logical address of the target data and the metadata. The index information may indicate the correspondence in a direct manner, or may indicate the correspondence between the logical address of the target data and the metadata in an indirect manner (for example, a manner of recording a key-value pair). For example, when the index acceleration module records the correspondence between the logical address of the target and the metadata, the index acceleration module may create a correspondence between a key and a value in the index information in an internal memory of the storage device, where the value is the metadata or an address of the metadata, and the key is determined based on the logical address of the target data.

In a possible implementation, the read/write module may further indicate a mirror device of the storage device to perform mirrored storage. For example, the read/write module may send a mirror data write command to the mirror device, where the mirror data write command is for requesting to write the target data, and the mirror data write command includes the target data and the logical address of the target data.

In a possible implementation, the read/write module may further determine the mirror device according to a mirror mapping relationship, where the mirror mapping relationship records a correspondence between the storage device and the mirror device.

In a possible implementation, the storage device includes at least two switch network adapters, and the storage device is connected to the mirror device through the at least two network adapters. The read/write module may select a switch network adapter from the at least two switch network adapters based on a load balancing policy, and then send the mirror data write command to a network adapter of the second storage device through the selected switch network adapter.

In a possible implementation, in addition to cooperating to perform data writing, the modules in the network adapter may further cooperate to implement data reading. The first protocol acceleration module may parse a data read command, where the data read command is for requesting to read the target data; and obtain the logical address of the target data from the data read command. The index acceleration module may obtain the metadata based on the logical address of the target data, where the metadata describes the physical address at which the target data is stored in the first storage device. Then, a read module may obtain the target data from the storage device based on the metadata.

In a possible implementation, before reading the metadata, the index acceleration module may further determine, based on the logical address of the target data, that a home node of the target data is the storage device.

In a possible implementation, the second protocol acceleration module is further configured to parse a second packet from the client device, and obtain the data read command. The data read command is based on the RDMA protocol, and the second packet is based on the IB, the RoCE, and the iWARP.

In a possible implementation, the first protocol acceleration module, the second protocol acceleration module, the index acceleration module, and the read/write module may be software modules; or the first protocol acceleration module, the second protocol acceleration module, the index acceleration module, and the read/write module may be hardware modules, for example, may be some or all of the following:

an ASIC, an FPGA, an AI chip, an SoC, a CPLD, and a GPU.

According to a fifth aspect, an embodiment of this application provides a storage device. The storage device includes a network adapter, and the network adapter is configured to perform the method performed by the front-end network adapter in the second aspect and the possible implementations of the second aspect.

In a possible implementation, the storage device further includes an internal memory. The internal memory is configured to store index information, and the index information indicates a correspondence between a logical address of target data and metadata.

According to a sixth aspect, an embodiment of this application further provides a network adapter. The network adapter may be a network adapter of a computer system or a server. The network adapter has functions of implementing behaviors in the method instances in the second aspect and the possible implementations of the second aspect. For beneficial effects, refer to the descriptions of the second aspect. Details are not described herein again.

In a possible implementation, a structure of the network adapter may include a processor and a memory. The processor is configured to support the network adapter in performing the corresponding functions of the network adapter in the second aspect. The memory is coupled to the processor, and stores program instructions and data that are necessary for the network adapter. The network adapter may further include an interface configured to communicate with another device, for example, receive a first packet or a second packet, or send a data access response.

In another possible implementation, the structure of the network adapter may alternatively include a processor and an interface. The processor is configured to support the network adapter in performing the corresponding function in the method of the second aspect. The processor may further transmit data through the interface, for example, receive the first packet or the second packet, or send the data access response.

According to a seventh aspect, this application further provides a computer-readable storage medium. The computer-readable storage medium stores instructions, and when the instructions are run on a computer, the computer is enabled to perform the method according to the second aspect and the possible implementations of the second aspect.

According to an eighth aspect, this application further provides a computer program product including instructions. When the computer program product is run on a computer, the computer is enabled to perform the method according to the second aspect and the possible implementations of the second aspect.

According to a ninth aspect, this application further provides a computer chip. The chip is connected to a memory, and the chip is configured to read and execute a software program stored in the memory, to perform the method according to the second aspect and the possible implementations of the second aspect.

BRIEF DESCRIPTION OF DRAWINGS

FIG. 3C is a schematic diagram of a structure of an D3 valid payload according to this application;

DESCRIPTION OF EMBODIMENTS

Figure 1A:
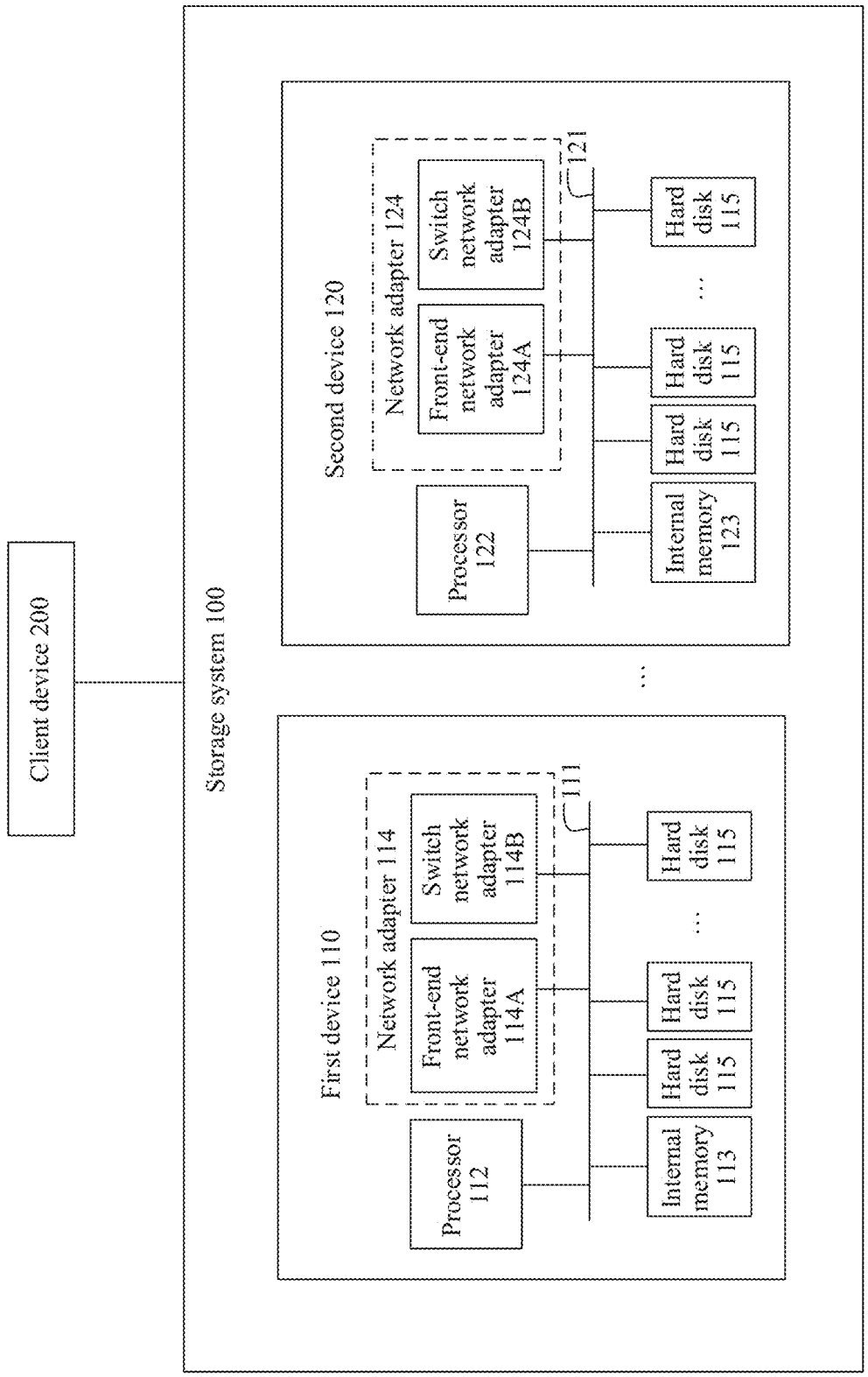
FIG. 1A is a schematic diagram of an architecture of a data access system according to this application.

Before a data access method provided in this application is described, concepts involved in this application are first described:

1. Metadata (Metadata)

Also known as intermediary data and trunk data, the metadata is data about data (data about data), and the metadata may indicate an attribute of the data. For example, the metadata may record a storage address of the data, modification information of the data, and the like.

2. Remote Direct Memory Access (RDMA)

The RDMA is a technology for accessing data in an internal memory of a remote device (for example, a storage device) by bypassing an operating system kernel of the remote device. Because the operating system is bypassed, not only a large quantity of CPU resources are saved, but also a system throughput is improved and a network communication delay of the system is reduced. The RDMA is especially suitable for wide application in a massively parallel computer cluster.

The RDMA mainly has the following characteristics: (1) Data is transmitted between a network and a remote device. (2) All content related to sending and transmission is unloaded to an intelligent network adapter without participation of the operating system kernel. (3) Data is directly transmitted between a user space virtual internal memory and the intelligent network adapter, the operating system kernel is not involved, and no extra data is moved or copied.

Currently, there are substantially three types of RDMA networks: infiniband (infiniband, IB), remote direct memory access over converged Ethernet (RDMA over Converged Ethernet, RoCE), and an Internet wide area remote direct memory access protocol (Internet Wide Area RDMA Protocol, iWARP). The infiniband is a network designed for the RDMA, to ensure reliable transmission in terms of hardware, and a network adapter and a switch that support this technology are required. The RoCE and the iWARP are both Ethernet-based RDMA technologies, and only special network adapters need to be configured.

3. One-Sided RDMA and Two-Sided RDMA

Two ends that need to exchange information with each other are respectively referred to as a client device (client for short) and a server (in this embodiment of this application, the server may be understood as a first storage device or a second storage device). The client is deployed on a user side, and users can use the client to send requests to the server. The server may be deployed at a remote end, and the server usually refers to a storage system, and may be specifically understood as a device in the storage system.

The one-sided RDMA may be divided into RDMA READ (READ) and RDMA WRITE (WRITE).

The RDMA READ in the one-sided RDMA is used as an example. The client may directly determine a location of metadata of to-be-read data in an internal memory of the server. Therefore, the packet that is initiated by the client and that is for requesting to read data carries location information of the metadata, and the packet is sent to the server. On a server side, a network adapter of the server side reads the metadata corresponding to the location information, and obtains the to-be-read data based on the metadata. In the foregoing process, a processor of the server side is unaware of a series of operations of the client. In other words, the processor of the server side does not know that the client has performed a read operation. Therefore, consumption of the processor in a data transmission process is reduced, and service processing performance of the system is improved, a high bandwidth, a low delay, and low CPU usage.

The two-sided RDMA may be divided into RDMA SEND (SEND) and RDMA RECEIVE (RECEIVE).

The RDMA RECEIVE in the two-sided RDMA is used as an example. The client does not know the location at which the metadata of the to-be-read data is stored in the internal memory of the server. Therefore, the packet that is initiated by the client and that is for requesting to read data does not carry the location information of the metadata. After the server receives the packet, the processor of the server side queries the location information of the metadata and returns the location information to the client. The client initiates, to the server for a second time, a packet used to request to read data. The packet includes the location information (that is, an address of the metadata) of the metadata. The network adapter of the server then obtains the metadata based on the location information of the metadata, further obtains the to-be-read data, and sends the to-be-read data to the client. The processor of the server side needs to participate in this process, that is, the two-sided RDMA requires the processor of the server side to process the packet from the client. Therefore, compared with the two-sided RDMA, the one-sided RDMA has a shorter data read time, lower processor usage, and better user experience. Therefore, the one-sided RDMA is more and more widely used.

4. Modules (Such as a First Protocol Acceleration Module, a Second Protocol Acceleration Module, a Read/Write Module, and an Index Acceleration Module)

In embodiments of this application, a module is intended to refer to a computer-related entity, hardware, software, software in execution, firmware, middleware, microcode, and/or any combination thereof. For example, a module may be a process allowed on a processor, a processor, an object, an executable thread, a program, and/or a computer. However, without limitation, one or more modules may reside in a process and/or an executable thread. In addition, these modules may be executed from various computer readable media that store various data structures.

For example, the module in this application may be a central processing unit (central processing unit, CPU), an application-specific integrated circuit (application-specific integrated circuit, ASIC), a field-programmable gate array (field-programmable gate array, FPGA), an artificial intelligence (artificial intelligence, AI) chip, a system on chip (system on chip, SoC), a complex programmable logic device (complex programmable logic device, CPLD), a graphics processing unit (graphics processing unit, GPU), and the like, or may be a software program run on a processor such as a CPU or a GPU.

5. A and/or B May Indicate Three Relationships: Only A Exists, Only B Exists, and Both A and B Exist.

FIG. 1A is a schematic diagram of a structure of a data access system according to an embodiment of this application. The system includes a client device 200 and a storage system 100. The storage system 100 includes a plurality of devices. FIG. 1A shows only two devices of the storage system as an example: a first device 110 and a second device 120.

Users access data by using applications. A computer running these applications is referred to as the "client device 200". The client device 200 may be a physical machine or a virtual machine. A physical client device 200 includes, but is not limited to, a desktop computer, a server, a notebook computer, and a mobile device.

The first device 110 includes one or more memories. The memory may include a hard disk, and may further include an internal memory or another device that can store data. Specific types of the one or more memories are not limited in this application.

The first device 110 can manage the one or more memories. Management operations herein include but are not limited to: recording a storage status of the one or more memories, and performing a read/write operation on the one or more memories (for example, writing data into the one or more memories, and reading data from the one or more memories).

For ease of description, the one or more memories of the first device 110 may be classified into two types: One type is an internal memory located in the first device 110, and the other type is an external memory that is connected to the first device 110 and may also be referred to as a secondary memory. A type of the secondary memory is not limited in this application. In this embodiment of this application, an example in which the secondary memory is a hard disk is used for description. However, a mechanical hard disk or another type of hard disk may alternatively be used as the secondary memory.

Specifically, for a structure of the first device 110, refer to FIG. 1A. The first device 110 includes a bus 111, a processor 112, an internal memory 113, a network adapter 114, and a hard disk 115. The processor 112, the internal memory 113, and the network adapter 114 communicate with each other through the bus 111.

It should be noted that, a structure of the first device 110 is similar to that of the second device 120, and the second device 120 also includes a bus 121, a processor 122, an internal memory 123, a network adapter 124, and a hard disk 125. A function and a structure of the second device 120 are similar to a function and the structure of the first device 110. For details, refer to the related descriptions of the first device 110. Details are not described herein again.

The processor 112 may be a central processing unit (central processing unit, CPU), or may be another processing chip or the like.

The internal memory 113 may include a volatile memory (volatile memory), such as a random access memory (random access memory, RAM) or a dynamic random access memory (dynamic random access memory, DRAM), may be a non-volatile memory (non-volatile memory), such as a storage-class memory (storage-class memory, SCM), or may be a combination of the volatile memory and the non-volatile memory or the like.

The internal memory 113 may further include a software module, such as an operating system, required for running a process. The operating system may be Linux™ Unix™, Windows™, or the like.

The network adapter 114 may perform, by invoking computer executable instructions stored in the internal memory 113, the data access method provided in embodiments of this application. The network adapter 114 may perform, alternatively by invoking computer executable instructions stored in the network adapter 114, the data access method provided in embodiments of this application. In some possible scenarios, the network adapter 114 may further be programmed with computer storage instructions, and the network adapter 114 may perform the data access method provided in embodiments of this application.

The first device 110 may further include one or more hard disks 115. The hard disks 115 may be configured to permanently store data. It should be noted that in the storage system shown in FIG. 1A, the first device 110 and the second device 120 are respectively connected to different hard disks. This is only a possible connection manner (for example, in a case in which the storage system 100 is a distributed storage system). In some scenarios, the first device 110 and the second device 120 may alternatively be connected to a same hard disk (for example, in a case in which the storage system is a centralized storage system). The first device 110 and the second device 120 can perform a read/write operation on these hard disks. In this embodiment of this application, the network adapter 114 of the first device 110 and the network adapter 124 of the second device 120 can perform read and write operations on these hard disks.

In this embodiment of this application, the network adapter 114 of the first device may be divided into a front-end network adapter 114A and a switch network adapter 114B in terms of functions.

The front-end network adapter 114A of the first device 110 is a network adapter 114 that is in the first device 110 and that is responsible for communicating with the client device 200, for example, receiving a packet from the client device 200, and feeding back a response to the client device 200. A quantity of front-end network adapters 114A of the first device 110 is not limited in this embodiment of this application, and may be one or more.

The switch network adapter 114B of the first device 110 is a network adapter 114 that is in the first device 110 and that is responsible for interacting with another device (for example, the second device 120) in the storage system, for example, forwarding a data access command to the second device 120, or sending a mirror data write command to the second device 120. The first device 110 may include one or more switch network adapters 114B that establish connections to the second device 120 (for example, to a switch network adapter 124B in the second device 120). When the first device 110 includes a plurality of switch network adapters 114B, the first device 110 may send a message to the second device 120 through any switch network adapter 114B. Particularly, when the first device 110 frequently interacts with the second device 120 or when the first device 110 and the second device 120 have a large amount of data to be exchanged, the plurality of switch network adapters 114B in the first device 110 can effectively share information that needs to be exchanged between the first device 110 and the second device 120, thereby effectively improving data transmission efficiency.

In FIG. 1A, an example in which the front-end network adapter 114A of the first device 110 and the switch network adapter 114B of the first device 110 are separately deployed is used for description. In some scenarios, the front-end network adapter 114A of the first device 110 and the switch network adapter 114B of the first device 110 may alternatively be deployed in a centralized manner. To be specific, the front-end network adapter 114A of the first device 110 and the switch network adapter 114B of the first device 110 may be presented as one network adapter 114 in a centralized manner. The network adapter 114 not only has a function of the front-end network adapter 114A, to communicate with the client device 200, but also has a function of the switch network adapter 114B, to interact with another device in the storage system. In this embodiment of this application, an example in which the front-end network adapter 114A of the first device 110 and the switch network adapter 114B of the first device 110 are separately deployed is used for description. Certainly, the data access method provided in embodiments of this application is also applicable to a case in which the front-end network adapter 114A of the first device 110 and the switch network adapter 114B of the first device 110 are deployed in a centralized manner. In this case, an exchange between the front-end network adapter 114A of the first device 110 and the switch network adapter 124B of the second device 120 may be understood as an internal exchange in the network adapter 114 of the first device 110.

In this embodiment of this application, the network adapter 114 of the first device 110 can directly interact with the client device 200, and write data or read data in the first device 110. The processor 112 of the first device 110 does not need to participate in the entire process. The following describes a structure of the network adapter 114 of the first device 110.

Figure 1B:
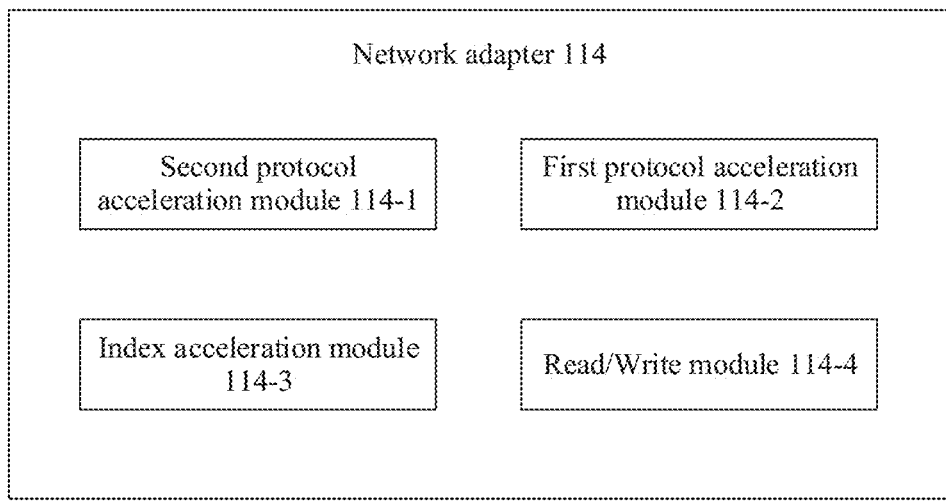
FIG. 1B is a schematic diagram of a structure of a network adapter according to this application.

The following uses the network adapter 114 of the first device 110 as an example to describe the structure of the network adapter. FIG. 1B is a schematic diagram of a structure of a network adapter according to an embodiment of this application. The network adapter 114 includes a first protocol acceleration module 114-2, a second protocol acceleration module 114-1, an index acceleration module 114-3, and a read/write module 114-4.

The second protocol acceleration module 114-1 can parse a packet (for example, a first packet or a second packet) from the client device 200, remove a part of a packet header from the packet, and obtain a data access command (for example, a data read command or a data write command) based on an RDMA protocol.

The first protocol acceleration module 114-2 can further parse the packet from the client device 200, that is, parse the data access command obtained after the second protocol acceleration module 114-1 parses the packet, to obtain information carried in the data access command, for example, obtain a logical address of data (for example, a logical address of first target data or a logical address of second target data).

The index acceleration module 114-3 is configured to maintain a correspondence between the logical address of the data and metadata of the data. The maintenance herein includes processing operations of saving, updating, creating, and the like.

When the data needs to be read, for example, the command parsed by the second protocol acceleration module 114-1 from the received packet is a data read command, the index acceleration module 114-3 can find the metadata of the data based on the logical address that is of the data and that is obtained by the first protocol acceleration module 114-2 and based on the maintained correspondence between the logical address of the data and the metadata of the data.

When the data needs to be written, for example, the command parsed by the second protocol acceleration module 114-1 from the received packet is a data write command, the index acceleration module 114-3 records the correspondence between the logical address of the data and the metadata of the data.

The correspondence that is between the logical address of the data and the metadata of the data and that is maintained by the index acceleration module 114-3 may be represented in various manners. For example, the index acceleration module 114-3 may maintain the correspondence between the logical address of the data and the metadata of the data in a direct manner. For example, the index acceleration module 114-3 may store a correspondence table, and each row in the correspondence table records a logical address of data and metadata of the data. Alternatively, each row records a logical address of data and an address of metadata of the data. For another example, the index acceleration module 114-3 may maintain the correspondence between the logical address of the data and the metadata of the data in an indirect manner. For example, the index acceleration module 114-3 may perform conversion on the logical address of the data, for example, convert a logical address of a long data length (this conversion may be implemented by hashing) into data of a short data length (for example, converted into a key), and record a correspondence between converted data and metadata of the data, or record a correspondence between converted data and an address of metadata of the data. For example, the index acceleration module 114-3 may record a key-value pair, where the key (key) is obtained after the logical address is converted, and the value (value) is the metadata of the data or the address of the metadata of the data.

In this embodiment of this application, the correspondence that is between the logical address of the data and the metadata of the data and that is maintained by the index acceleration module 114-3 is generally referred to as index information. Same as the foregoing descriptions, the index information may record the correspondence between the logical address of the data and the metadata of the data in a direct manner, or may record the correspondence between the logical address of the data and the metadata of the data in an indirect manner (for example, the index information records the correspondence between the logical address of the data and the metadata of the data in a form of the key-value pair). A location at which the index information is stored is not limited in this embodiment of this application. The index information may be stored in the network adapter 114 (for example, stored in a memory in the network adapter 114), or may be stored in the memory of the first device 110, for example, the internal memory of the first device 110.

The read/write module 114-4 is configured to read data from the memory of the first device 110, or write data into the memory of the first device 110.

When the data needs to be read, the read/write module 114-4 may obtain the metadata of the data or the address of the metadata of the data from the index acceleration module 114-3, determine a physical address of the data based on the metadata of the data, and read the data based on the physical address of the data. When the read/write module 114-4 reads the data, if the data is stored in the external memory such as the hard disk of the first device 110, the read/write module 114-4 may first read the data from the external memory such as the hard disk of the first device 110 to the internal memory of the first device 110, and then read the data from the internal memory of the first device 110. The read/write module 114-4 may alternatively directly read the data from the external memory such as the hard disk of the first device 110.

When the data needs to be written, the read/write module 114-4 may write the data into the memory of the first device 110. A data write manner of the read/write module 114-4 may be an appending (append) manner, and the data that needs to be written this time is written starting from an end address of data written last time. When writing the data, the read/write module 114-4 may further generate the metadata of the data, and send the metadata of the data to the index acceleration module 114-3, so that the index acceleration module 114-3 may record the correspondence between the logical address of the data and the metadata of the data. Certainly, the read/write module 114-4 may alternatively store the metadata of the data after generating the metadata of the data, and send the address of the metadata of the data to the index acceleration module 114-3, so that the index acceleration module 114-3 may record a correspondence between the data and the metadata of the data. The data write manner of the read/write module 114-4 may alternatively be another writing manner. This is not limited in this embodiment of this application.

A type of the storage system is not limited in this embodiment of this application. In practice, the storage system in FIG. 1A may be represented as a centralized storage system or may be represented as a distributed storage system. The following describes a storage system to which embodiments of this application are applicable.

1. Centralized Storage System

Figure 2A:
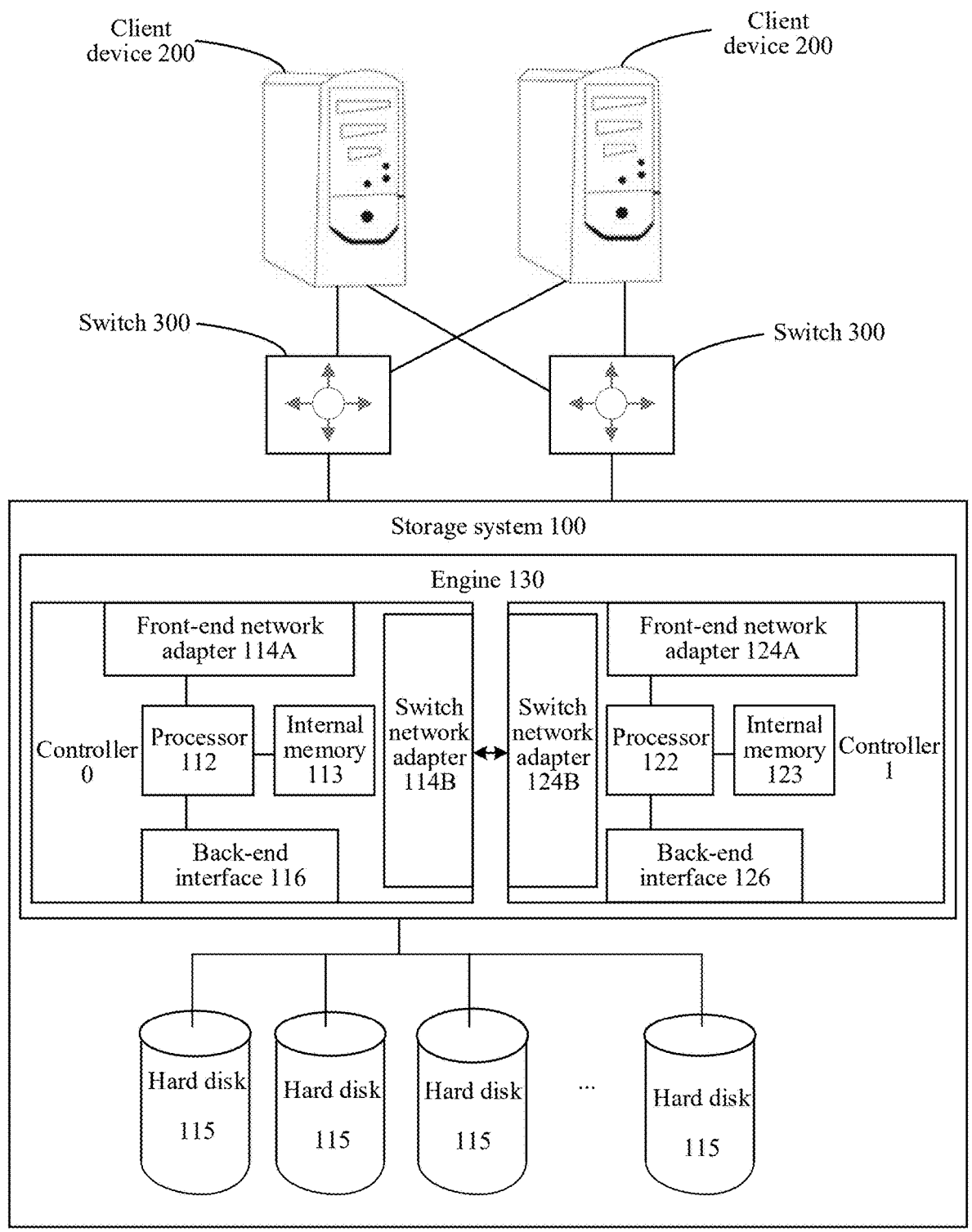
FIG. 2A is a schematic diagram of a data access system according to this application.

FIG. 2A is a schematic diagram of a system architecture according to an embodiment of this application. The system architecture includes a storage system 100, a client device 200, and a switch 300.

For descriptions of the client device 200, refer to the related descriptions in FIG. 1A. Details are not described herein again. The client device 200 accesses the storage system 100 through a fiber switch 300 to access data. However, the switch 300 is only an optional device, and the client device 200 may alternatively directly communicate with the storage system 100 through a network. The storage system 100 shown in FIG. 2A is a centralized storage system 100. The centralized storage system 100 has a unified entry, and all data from an external device needs to pass through the entry, and the entry is an engine 130 of the centralized storage system 100. The engine 130 is a most core component in the centralized storage system 100, and many advanced functions of the storage system 100 are implemented in the engine 130.

As shown in FIG. 2A, the engine 130 includes one or more controllers. In FIG. 2A, an example in which the engine 130 includes two controllers is used for description. There is a mirror channel between a controller 0 and a controller 1. Therefore, after writing a piece of data into an internal memory of the controller 0, the controller 0 may send a copy of the data to the controller 1 through the mirror channel, and the controller 1 stores the copy in a local internal memory of the controller 1. Therefore, the controller 0 and the controller 1 back up each other. When a fault occurs on the controller 0, the controller 1 may take over a service of the controller 0, and when a fault occurs on the controller 1, the controller 0 may take over a service of the controller 1, thereby avoiding unavailability of the entire storage system 100 caused by a hardware fault. When four controllers are deployed in the engine 130, a mirror channel exists between any two controllers. Therefore, any two controllers back up each other. The controller 0 and the controller 1 herein are equivalent to the first device 110 and the second device 120 shown in FIG. 1A.

Using the controller 0 as an example, in terms of hardware, the controller 0 includes a processor 112, an internal memory 113, and a front-end network adapter 114A. The front-end network adapter 114A is configured to communicate with the client device 200, to provide a storage service for the client device 200. The controller 0 further includes a back-end interface 116. The back-end interface 116 is configured to communicate with a hard disk 115, to expand a capacity of the storage system 100. Through the back-end interface 116, the engine 130 may be connected to more hard disks 115, thereby forming a large storage resource pool. In FIG. 2A, the controller 0 may further include a switch network adapter 114B, and the controller 0 may be connected to the controller 1 through the switch network adapter 114B. For descriptions of the processor 112, the internal memory 113, the front-end network adapter 114A, and the switch network adapter 114B, refer to the related descriptions in the embodiment shown in FIG. 1A. Details are not described herein again.

The front-end network adapter 114A (or in cooperation with the switch network adapter 114B) in the controller 0 may perform the data access method provided in embodiments of this application.

In this embodiment of this application, the first device 110 is used as an example. When receiving a packet (for example, a first packet or a second packet) sent by the client device 200, the front-end network adapter 114A may perform the data access method provided in embodiments of this application, to process the packet. When the first packet carries a data read command, if target data that needs to be read is located in the internal memory 113, the front-end network adapter 114A may directly read the target data from the internal memory 113, and feed back the target data to the client device 200 through a data read response. If the target data that needs to be read is located in the hard disk 115, the front-end network adapter 114A may first read the target data from the hard disk 115 to the internal memory 113, then read the target data from the internal memory 113, and feed back the target data to the client device 200 through a data access response.

When the packet carries a data write command, the front-end network adapter 114A may first write target data that needs to be written into the internal memory 113, and when a total amount of data in the internal memory 113 reaches a specific threshold, the data stored in the internal memory 113 is sent, through the back-end interface 116, to the hard disk 115 for persistent storage.

The front-end network adapter 114A may run computer-executable instructions in the internal memory 113 to manage the hard disk 115, and the front-end network adapter 114A may also run computer-executable instructions stored in the front-end network adapter 114A or computer-executable instructions programmed by the front-end network adapter 114A to manage the hard disk 115. For example, the hard disk 115 (and the internal memory 113) is abstracted into a storage resource pool, and then the storage resource pool is divided into logical unit numbers (logical unit number, LUN) to be provided to the client device 200 for use. The LUNs are actually storage space that can be seen on the client device 200. Certainly, some centralized storage systems 100 are also file servers, and may provide a file sharing service for a server.

Hardware components and software structures of the controller 1 (and other controllers that are not shown in FIG. 2A) are similar to those of the controller 0. Details are not described herein again.

FIG. 2A shows a centralized storage system with disk and controller separation. In the system, the engine 130 may not have a disk slot, the hard disk 115 needs to be placed in a disk enclosure, and the back-end interface 116 communicates with the disk enclosure. The back-end interface 116 exists in the engine 130 in a form of an adapter card. Two or more back-end interfaces 116 may be simultaneously used on one engine 130 to connect to a plurality of disk enclosures. Alternatively, the adapter card may alternatively be integrated on a mainboard. In this case, the adapter card may communicate with the processor 112 through a PCIE bus. In the system, the engine 130 may alternatively have a disk slot, the hard disk 115 is directly inserted into the disk slot, and the back-end interface 116 communicates with each hard disk. In the centralized storage system, hard disks 115 managed by the controller 0 and the controller 1 may be the same or may be different. For example, the controller 0 may manage some hard disks 115, and the controller 1 manages remaining hard disks 115.

2. Distributed Storage System

Figure 2B:
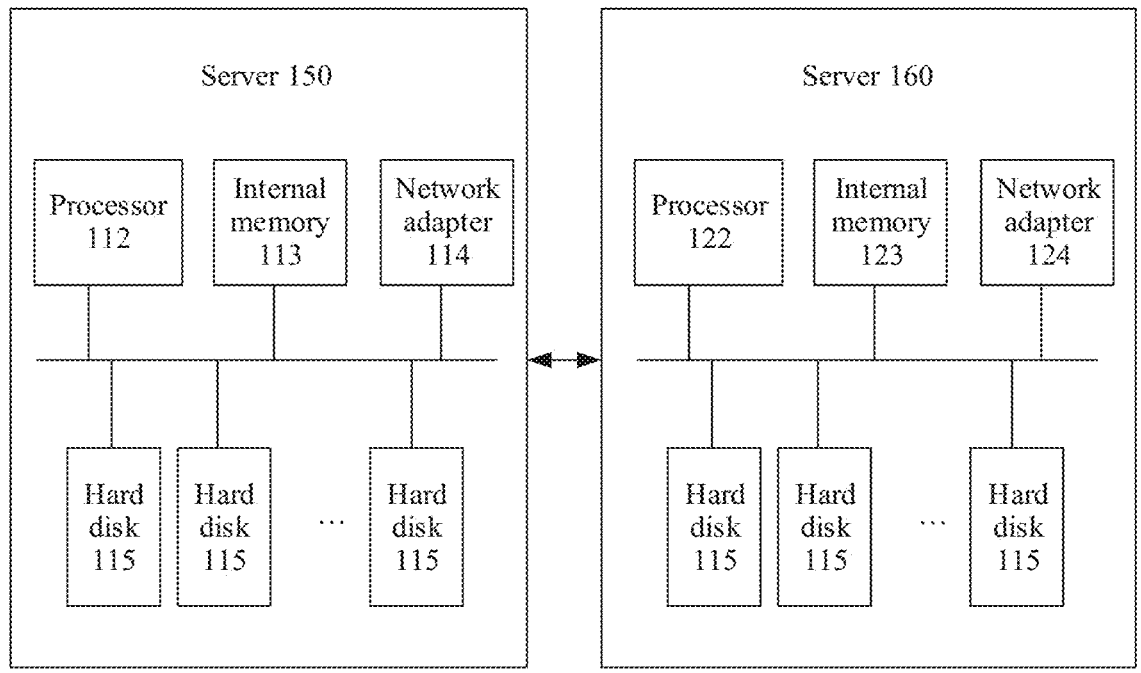
FIG. 2B is a schematic diagram of a data access system according to this application.

The data access method provided in embodiments of this application is not only applicable to the centralized storage system, but also applicable to the distributed storage system. FIG. 2B is a schematic diagram of a system architecture of a distributed storage system according to an embodiment of this application. The distributed storage system 100 includes a server cluster. The server cluster includes one or more servers (that include a server 150 and a server 160 shown in FIG. 2B, but are not limited to the two servers), and the servers may communicate with each other. The server is a device that has both a computing capability and a storage capability, such as a server or a desktop computer. On software, each server is provided with an operating system. The server 150 and the server 160 are respectively equivalent to the first device 110 and the second device 120 shown in FIG. 1A.

The server 150 is used as an example for description. A network adapter 114 in the server 150 may perform the data access method provided in embodiments of this application. In terms of hardware, as shown in FIG. 2B, the server 150 includes at least a processor 112, an internal memory 113, the network adapter 114, and a hard disk 115. The processor 112, the internal memory 113, the network adapter 114, and the hard disk 115 are connected to each other through a bus. For functions and types of the processor 112, the internal memory 113, the network adapter 114, and the hard disk 115, refer to the related descriptions of the processor 112, the internal memory 113, the network adapter 114, and the hard disk 115 of the first device 110 shown in FIG. 1A. Details are not described herein again.

When receiving a packet sent by a client device 200, the network adapter 114 may perform the data access method provided in embodiments of this application, to process the packet. When the packet carries a data read command, if target data that needs to be read is located in the internal memory 113, the target data may be directly read from the internal memory 113, and the target data is fed back to the client device 200 through a data read response. If the target data that needs to be read is located in the hard disk 115, the target data may be first read from the hard disk 115 to the internal memory 113, then the target data is read from the internal memory 113, and the target data is fed back to the client device 200 through a data access response. When the packet carries a data write command, the network adapter 114 may first write target data that needs to be written into the internal memory 113, and when a total amount of data in the internal memory 113 reaches a specific threshold, the back-end interface 116 sends the data stored in the internal memory 113 to the hard disk 115 for persistent storage.

The hard disk 115 is configured to provide a storage resource, for example, to store data. The hard disk 115 may be a magnetic disk or another type of storage medium, for example, a solid-state disk or a shingled magnetic recording hard disk. The network adapter 114 is configured to communicate with another client device 200.

The centralized storage system and the distributed storage system described above are merely examples. The data access method provided in embodiments of this application is also applicable to another centralized storage system and distributed storage system.

Figure 3A:
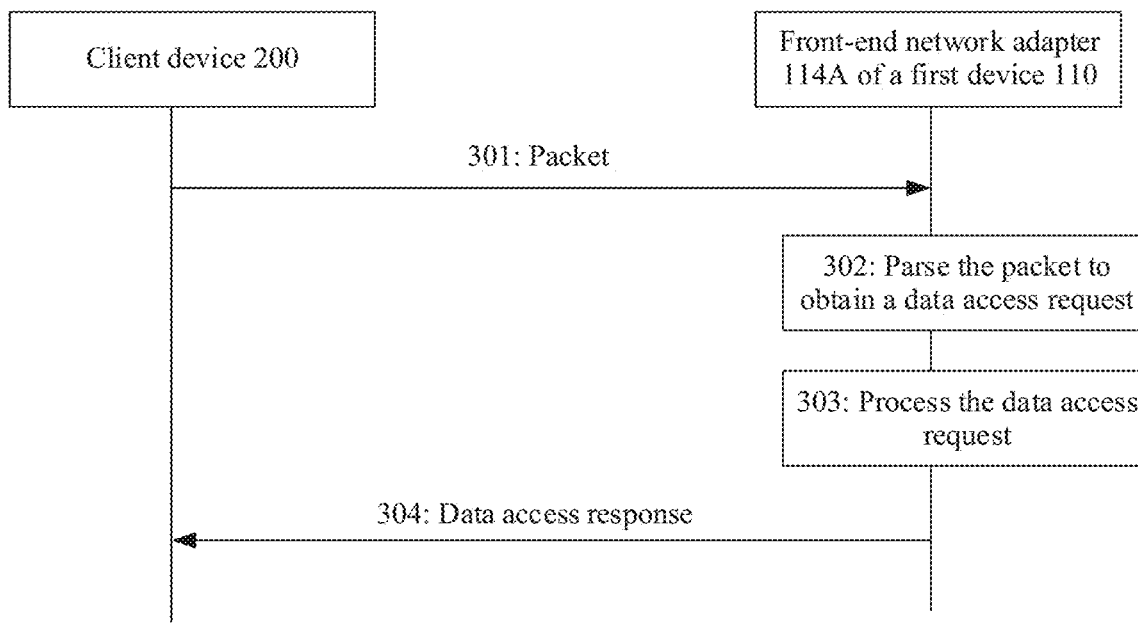
FIG. 3A is a schematic diagram of a data access method according to this application.

FIG. 3A shows a data access method according to an embodiment of this application. A first device 110 mentioned in the method may be a controller (for example, the controller 0 or the controller 1) in FIG. 2A, or may be the server 150 or the server 160 in FIG. 2B.

Step 301: A client device 200 sends a packet to the first device 110, where the packet is for requesting to access target data.

In this embodiment of this application, at least two types of packets are included. One type is a packet carrying a data write command, where the data write command is for requesting to write the target data. The data write command carries the target data and a logical address into which the target data needs to be written (the logical address in this embodiment of this application may be referred to as a logical address of the target data). The other type is a packet carrying a data read command, where the data read command is for requesting to read the target data, and the data read command carries the logical address of the target data.

A protocol supported by the packet is not limited in this embodiment of this application. For example, the packet may support infiniband, RoCE, and an iWARP. For packets that support different protocols, information carried in the packets is similar. A difference lies in that the information may be placed at different locations in the packets of different protocols.

An example in which the packet is a packet supporting the RoCE is used to describe a structure of the packet.

Figure 3B:
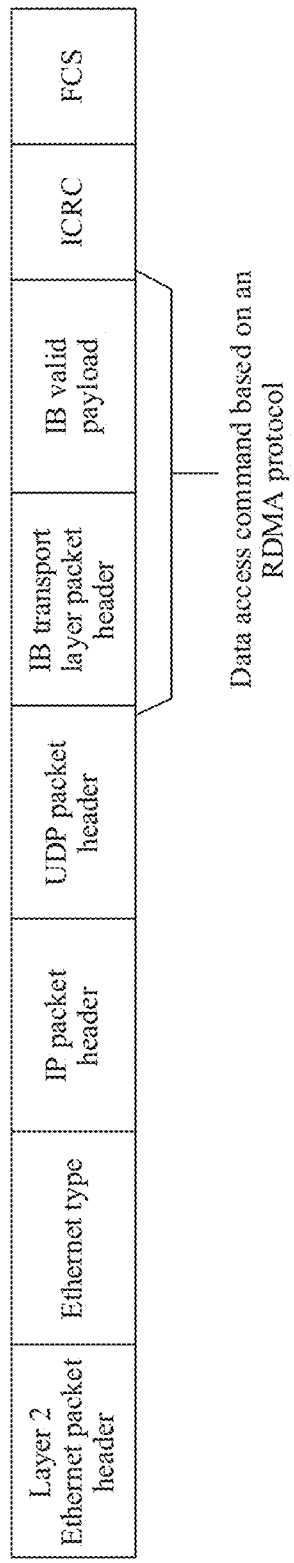
FIG. 3B is a schematic diagram of a structure of a packet according to this application.

FIG. 3B is a schematic diagram of a structure of a packet supporting RoCE according to an embodiment of this application. The packet may be divided into two parts. One part is a data access command based on an RDMA protocol, for example, an RDMA SEND command (a command that needs to be sent in an RDMA SEND operation) and an RDMA RECEIVE command (a command that needs to be sent in an RDMA RECEIVE operation). The data access command includes an D3 transport layer packet header and an IB valid payload. The D3 transport layer packet header records information about an IB transport layer.

A remaining part is information required for supporting network transmission, including a layer 2 Ethernet packet header, an Ethernet type, an Internet Protocol (Internet Protocol, IP) packet header, a user datagram protocol (user datagram protocol, UDP) packet header, a cyclic redundancy check (cyclic redundancy check, ICRC), and a frame check sequence (frame check sequence, FCS).

The layer 2 Ethernet packet header is for recording information about a layer 2 network, for example, a source address and a destination address in the layer 2 network. The IP packet header records a source IP address and a destination IP address in an IP network. A destination port number 4791 in the UDP packet header indicates a RoCEv2 frame. The ICRC and the FCS are parameters set to ensure data integrity.

Step 302: After the packet arrives at the first device 110, a front-end network adapter 114A of the first device 110 first receives the packet, parses the packet, obtains the data access command carried in the packet, and obtains information carried in the data access command, for example, obtains the target data and the logical address of the target data (for example, the data access command is a data write command), or obtains the logical address of the target data (for example, the data access command is a data read command).

The front-end network adapter 114A of the first device 110 may parse the packet in two steps. A first step of parsing may be performed by a second protocol acceleration module 114-1. The second protocol acceleration module 114-1 may obtain the data access command based on the RDMA protocol from the packet. The second protocol acceleration module 114-1 can parse information in the packet except the data access command based on the RDMA protocol. A second step of parsing may be performed by a first protocol acceleration module 114-2. The first protocol acceleration module 114-2 can parse the data access command, determine a type of the data access command, and obtain the information carried in the data access command.

An example in which the packet is the packet supporting the RoCE and the data access command carried in the packet is the data write command is still used. FIG. 3C is a schematic diagram of a structure of the IB valid payload. The valid payload includes operation code (operation code, OPcode), a command identifier (command identifier), a namespace identifier (namespace Identifier, NSID), a buffer address (buffer address), a length (length), the target data, a logical block address (logic block address, LBA), and a logical unit number (logical unit number, LUN). The buffer address, the length, and the target data may be placed in the D3 valid payload in a format of a scatter gather list (scatter gather list, SGL). When the data access command is the data read command, a structure of the IB valid payload is similar to the structure shown in FIG. 3C. A difference lies in that when the data access command is the data read command, the D3 valid payload does not include the target data.

The OPcode can indicate an operation corresponding to the data access command, for example, may indicate write (write) or read (read). The command identifier is for identifying the data access command. The NSID indicates a namespace corresponding to the data access command. The buffer address indicates a buffer location of the target data after a receive end receives the data access command. After receiving the data write command, the front-end network adapter 114A of the first device 110 may temporarily store the target data at the location indicated by the buffer address. After receiving the data read command, the front-end network adapter 114A of the first device 110 may temporarily buffer the obtained target data at the location indicated by the buffer address. The length indicates a length of the target data. The logical block address and the logical unit number may indicate a starting logical address of the target data. The logical block address, the logical unit number, and the length may indicate an address segment.

The front-end network adapter 114A of the first device 110 may obtain the logical address of the target data from the D3 valid payload, for example, may obtain the length of the target data, the LBA, and the LUN.

Step 303: After parsing the data access command, the front-end network adapter 114A of the first device 110 may process the data access command in a memory of the first device 110 based on the logical address of the target data.

When the data access command is the data write command, the front-end network adapter 114A of the first device 110 may store the target data at a location indicated by the logical address in the memory of the first device 110.

When the data access command is the data read command, the front-end network adapter 114A of the first device 110 may read, the target data from the location indicated by the logical address in the memory of the first device 110.

Step 304: After processing the data access command, the front-end network adapter 114A of the first device 110 may feed back a data access response to the client device 200.

When the data access command is the data write command, the data access response is a data write response, and the data write response indicates that the target data is successfully written.

When the data access command is the data read command, the data access response is a data read response, and the data read response carries the target data.

It can be learned that, the front-end network adapter 114A of the first device 110 has different processing manners based on different types of data access commands. The following separately describes processing manners of the front-end network adapter 114A of the first device 110 based on the data write command and the data read command.

1. The Data Access Command is a Data Write Command.

Figure 4:
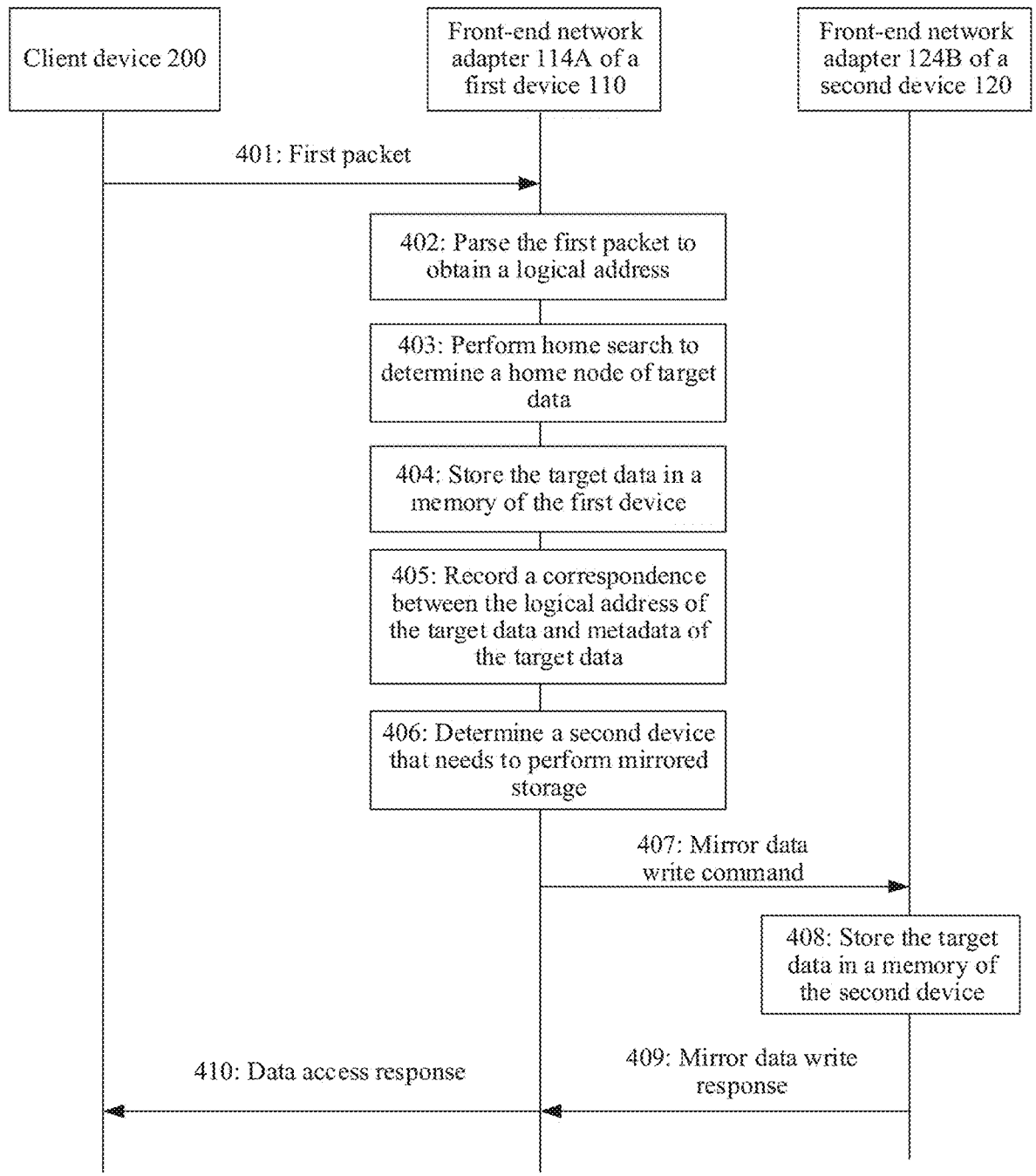
FIG. 4 is a schematic diagram of a data access method according to this application.

FIG. 4 shows a data access method according to an embodiment of this application. In this method embodiment, a front-end network adapter 114A of a first device 110 receives a first packet carrying a data write command. The front-end network adapter 114A of the first device 110 can independently process the first packet, and may individually write first target data carried in the data write command to a memory (for example, an internal memory 113 or a hard disk 115 of the first device 110) of the first device 110, and a processor 112 of the first device 110 does not need to participate in the entire process, so that consumption of the processor 112 of the first device 110 can be reduced. The front-end network adapter 114A of the first device 110 directly writes the first target data into the memory of the first device 110, thereby effectively improving data write efficiency. The method includes:

Step 401: The front-end network adapter 114A of the first device 110 receives the first packet from a client device 200, where the first packet carries the data write command, and the data write request is for requesting to write the first target data. The data write command carries the first target data and a logical address (which is referred to as a logical address of the first target data for short in this embodiment of this application) into which the first target data needs to be written.

The logical address of the first target data is a logical address that can be sensed by the client device 200 side. A representation manner of the logical address of the first target data is not limited in this embodiment of this application. For example, the logical address of the first target data may include a logical starting address of the first target data and a data length (length) of the first target data. The logical start address may be represented by an LBA and a LUN.

Step 402: The front-end network adapter 114A of the first device 110 parses the first packet, and obtains the logical address of the first target data and the first target data from the data write command.

For a manner in which the front-end network adapter 114A of the first device 110 parses the first packet and obtains the logical address of the first target data and the first target data, refer to the embodiment shown in FIG. 3A. Details are not described herein again.

Step 403: After the front-end network adapter 114A of the first device 110 obtains the logical address of the first target data, the front-end network adapter 114A of the first device 110 may first determine, based on the logical address of the first target data, whether a home node of the first target data is the first device 110. In other words, the front-end network adapter 114A of the first device 110 needs to determine, based on the logical address of the first target data, whether a node in which the first target data needs to be stored is the first device 110. This step may be performed by an index acceleration module 114-3 in the front-end network adapter 114A of the first device 110.

In a storage system, storage space including a plurality of hard disks in the storage system is mapped to a plurality of storage logical layers, and an address segment in each storage logical layer is corresponding to an address segment in a next storage logical layer. The client device 200 can sense an address of an uppermost storage logical layer, and the address is a logical address. Storage space indicated by these logical addresses may be an internal memory or a hard disk of each device in the storage system. Different devices in the storage system may manage respective internal memories and respective external memories such as hard disks. A device in the storage system can process only a data access command that carries a logical address formed after an internal memory or a hard disk that is managed by the device is mapped.

After parsing out the logical address of the first target data from the data write command, the front-end network adapter 114A of the first device 110 may first determine, based on the logical address of the first target data, whether storage space indicated by the logical address is storage space that can be managed by the first device 110, that is, determine whether the home node of the first target data is the first device 110. In this embodiment of this application, a process of determining the home node of the first target data is referred to as home search.

A manner in which the front-end network adapter 114A of the first device 110 performs home search is not limited in this embodiment of this application. The following lists two manners:

Manner 1: The front-end network adapter 114A of the first device 110 may perform hashing on the logical address of the first target data, to determine the home node of the first target data.

Hashing may also be referred to as hash operation, and hashing refers to converting input data of any length into an output of a fixed length. In step 403, the front-end network adapter 114A of the first device 110 may use the logical address of the first target data as an input for hashing, and perform hashing on the logical address of the first target data, to obtain a hash value. There are a plurality of specific forms of hashing, hash values obtained by different hashing are also different, and information indicated by the hash values is also different.

For example, the hash value may indicate the home node of the first target data. For example, the hash value may be an identifier of the home node of the first target data. The front-end network adapter 114A of the first device 110 may determine, based on the hash value, whether the home node of the first target data is the first device 110.

For another example, the hash value may be a key, and the front-end network adapter 114A of the first device 110 may store correspondences between different keys and devices. The first device 110 may search for a corresponding device based on the key, and a found device is the home node of the first target data.

Manner 2: The front-end network adapter 114A of the first device 110 records correspondences between logical addresses of data and devices. The front-end network adapter 114A of the first device 110 may search for a device corresponding to the logical address of the first target data in the correspondences between the logical addresses of the data and the devices, and a found device is the home node of the first target data.

Step 404: After the front-end network adapter 114A of the first device 110 determines that the home node of the first target data is the first device 110, the front-end network adapter 114A of the first device 110 may store the first target data in the memory of the first device 110 based on the logical address of the first target data. This step may be performed by a read/write module 114-4 in the front-end network adapter 114A of the first device 110.

Because the memory of the first device 110 may be divided into the internal memory 113 and the hard disk 115, the front-end network adapter 114A of the first device 110 may preferentially write the first target data into the internal memory 113 of the first device 110. After a volume of data stored in the internal memory 113 of the first device 110 reaches a threshold, the front-end network adapter 114A of the first device 110 may transfer the first target data from the internal memory 113 to the hard disk 115 of the first device 110. Regardless of whether the first target data is written into the internal memory 113 or the first target data is transferred from the internal memory 113 to the hard disk 115 of the first device 110, when writing the first target data, the front-end network adapter 114A of the first device 110 may use an appending manner to write the first target data starting from an end address of last written data.

Step 405: The front-end network adapter 114A of the first device 110 generates first metadata of the first target data, and records a correspondence between the logical address of the first target data and the first metadata of the first target data.

Specifically, in the front-end network adapter 114A of the first device 110, after writing the first target data, the read/write module 114-4 may generate the first metadata of the first target data. The read/write module 114-4 may perform any one of the following operations.

Operation 1: The read/write module 114-4 may directly transfer the first metadata of the first target data to the index acceleration module 114-3, and the index acceleration module 114-3 may record the correspondence between the logical address of the first target data and the first metadata of the first target data.

A manner in which the index acceleration module 114-3 records the correspondence may be a direct recording manner. The correspondence between the logical address of the first target data and the first metadata of the first target data is directly recorded in index information maintained by the index acceleration module 114-3.

A manner in which the index acceleration module 114-3 records the correspondence may alternatively be an indirect recording manner. The index acceleration module 114-3 may perform hashing on the logical address of the first target data, to obtain a key corresponding to the logical address, and create a key-value pair in the index information, where the value in the key-value pair is the first metadata of the first target data.

Operation 2: The read/write module 114-4 may store the first metadata of the first target data in the memory (for example, the internal memory 113) of the first device 110, and transmit an address (that is, a storage address of the first metadata in the memory of the first device 110) of the first metadata of the first target data to the index acceleration module 114-3. The index acceleration module 114-3 may record the correspondence between the logical address of the first target data and the address of the first metadata of the first target data.

A manner in which the index acceleration module 114-3 records the correspondence may be a direct recording manner. A correspondence between the logical address of the first target data and the address of the first metadata of the first target data is directly recorded in index information maintained by the index acceleration module 114-3.

A manner in which the index acceleration module 114-3 records the correspondence may alternatively be an indirect recording manner. The index acceleration module 114-3 may perform hashing on the logical address of the first target data, to obtain a key corresponding to the logical address, and create a key-value pair in the index information, where the value in the key-value pair is the address of the first metadata of the first target data.

In this embodiment of this application, in addition to writing the first target data into the memory of the first device 110, the front-end network adapter 114A of the first device 110 may further indicate another device in the storage system to perform mirrored storage, that is, store a copy of the first target data in the another device, thereby ensuring data reliability. For a method in which the front-end network adapter 114A of the first device 110 indicates the another device in the storage system to perform mirrored storage, refer to step 406 to step 409. The processor 112 of the first device 110 also does not need to participate in a process of indicating the another device in the storage system to perform mirrored storage, so that consumption of the processor 112 of the first device 110 can be reduced. The front-end network adapter 114A of the first device 110 directly indicates the another device in the storage system to perform mirrored storage, thereby effectively improving data write efficiency.

Step 406: The front-end network adapter 114A of the first device 110 determines a second device 120 that needs to perform mirrored storage. This step may be performed by the read/write module 114-4 in the front-end network adapter 114A of the first device 110.

In the storage system, mirror mapping relationships may be configured for the devices in the storage system. Two devices that have a mirror mapping relationship mirror each other. When a device in the storage system needs to store data, the data that needs to be stored may be carried in a mirror data write command, and the mirror data write command is sent to a device that has a mirror mapping relationship with the device. The mirror data write command is for requesting the device that has a mirror mapping relationship with the device to store a copy of the data (the copy of the data may be another piece of the data, or may be data that is highly similar to the data and has redundant data removed), to implement mirrored storage. For any device in the storage system, the device may have a mirror mapping relationship with another device in the storage system, or may have mirror mapping relationships with a plurality of other devices in the storage device. A quantity of devices that have mirror mapping relationships with the device is not limited in this embodiment of this application.

The first device 110 in the storage system is used as an example. A mirror mapping relationship of the first device 110 may be preconfigured in the front-end network adapter 114A of the first device 110. For example, the mirror mapping relationship of the first device 110 may be preconfigured in the front-end network adapter 114A of the first device 110 by the processor 112 of the first device 110. The mirror mapping relationship of the first device 110 may be stored in the front-end network adapter 114A of the device. The front-end network adapter 114A may directly determine, by locally obtaining the mirror mapping table relationship, a device that has a mirror mapping relationship with the first device 110. The mirror mapping relationship of the first device 110 may alternatively be stored in the internal memory 113 of the first device 110. When determining the device that has a mirror mapping relationship with the first device 110, the front-end network adapter 114A may first invoke the mirror mapping relationship from the internal memory 113 of the first device 110, and then determine, based on the obtained mirror mapping table relationship, the device that has a mirror mapping relationship with the first device 110.

An example in which the mirror mapping relationship of the first device 110 indicates that the first device 110 and the second device 120 mirror each other is used. The front-end network adapter 114A of the first device 110 may determine the second device 120 based on the mirror mapping relationship of the first device 110. Certainly, if the mirror mapping relationship of the first device 110 indicates that the first device 110 and a plurality of devices (the plurality of devices include the second device 120) mirror each other, the first device 110 may select one device from the plurality of devices, for example, select the second device 120.

In the foregoing descriptions, a manner in which the front-end network adapter 114A of the first device 110 determines the second device 120 based on the mirror mapping relationship is merely an example. In actual application, the front-end network adapter 114A of the first device 110 may alternatively select, in another manner, the second device 120 that needs to perform mirrored storage. For example, the front-end network adapter 114A of the first device 110 may select one device from a plurality of devices connected to the first device 110, and indicated the selected device to perform mirrored storage (that is, perform step 405). An example in which the device selected by the front-end network adapter 114A of the first device 110 is the second device 120 is used. After selecting the second device 120, the front-end network adapter 114A of the first device 110 may locally record a correspondence between the first device 110 and the second device 120. Subsequently, if the front-end network adapter 114A of the first device 110 needs to write other data (for example, the front-end network adapter 114A of the first device 110 receives a data write command that carries other data), the front-end network adapter 114A of the first device 110 may directly determine the second device 120 based on the correspondence between the first device 110 and the second device 120, and indicate the second device 120 to perform mirrored storage on the other data.

Step 407: The front-end network adapter 114A of the first device 110 sends the mirror data write command to a switch network adapter 124B of the second device 120, where the mirror data write command includes the first target data and the logical address into which the first target data needs to be written. This step may be performed by the read/write module 114-4 in the front-end network adapter 114A of the first device 110.

After selecting the second device 120, the front-end network adapter 114A of the first device 110 may generate the mirror data write command. For example, the front-end network adapter 114A of the first device 110 may reserve an D3 valid payload in the data write command, change a destination address and a source address in the data write command, change the destination address to an address of the second device 120, and change the source address to an address of the first device 110. A changed data write command is the mirror data write command.

When the front-end network adapter 114A of the first device 110 sends the mirror data write command to the switch network adapter 124B of the second device 120, if the first device 110 is connected to the second device 120 through at least two switch network adapters 114B, the front-end network adapter 114A of the first device 110 may further select a switch network adapter 114B from the at least two switch network adapters 114B, and send the mirror data write command to the switch network adapter 124B of the second device 120 through the selected switch network adapter 114B.

A manner in which the front-end network adapter 114A of the first device 110 selects a switch network adapter 114B from the plurality of switch network adapters 114B is not limited in this embodiment of this application. For example, the front-end network adapter 114A of the first device 110 may randomly select one of the switch network adapters 114B. For another example, the front-end network adapter 114A of the first device 110 may select one switch network adapter 114B from the plurality of switch network adapters 114B based on a load balancing policy.

The load balancing policy describes a rule that needs to be followed when a switch network adapter 114B is selected from the plurality switch network adapters 114B, to ensure that different switch network adapters 114B can all achieve load balancing, that is, volumes of data transmitted by the switch network adapters 114B are consistent or close.

Step 408: After receiving the mirror data write command, a network adapter 124 of the second device 120 may write the first target data into a memory of the second device 120 based on the logical address of the first target data.

A manner in which the network adapter 124 of the second device 120 writes the first target data into the memory of the second device 120 based on the logical address of the first target data is similar to the manner in which the network adapter 114 of the first device 110 writes the first target data into the memory of the first device 110 based on the logical address of the first target data in step 405. For details, refer to the foregoing descriptions. Details are not described herein again.

Step 409: After writing the first target data, the network adapter 124 of the second device 120 may feed back a mirror data write response to the front-end network adapter 114A of the first device 110, to indicate that the first target data is successfully written.

Step 410: After receiving the mirror data write response, the front-end network adapter 114A of the first device 110 may first feed back a data write response to the client device 200, to indicate that the first target data is successfully written. This step may be performed by the first protocol acceleration module 114-2 in cooperation with the second protocol acceleration module 114-1 in the front-end network adapter 114A of the first device 110. That is, the first protocol acceleration module 114-2 may first encapsulate information that needs to be fed back into a message format supporting RDMA, and the second protocol acceleration module 114-1 may encapsulate, on the basis of the first protocol acceleration module 114-2, the message encapsulated by the first protocol acceleration module 114-2 into the data write response supporting RoCE, IB, or an iWARP. It should be noted that, in step 410, the front-end network adapter 114A of the first device 110 feeds back the data write response to the client device 200 only after receiving the mirror data write response. In actual application, the front-end network adapter 114A of the first device 110 may alternatively feed back the data write response to the client device 200 after storing the first target data in the first device 110, and then indicate the second device 120 to perform a mirroring operation. Alternatively, in some scenarios, the front-end network adapter 114A of the first device 110 may feed back the data write response to the client device 200 after sending the mirror data write command to the second device 120. In other words, a sequence of the step of feeding back the data write response to the client device 200 and the step of indicating the second device 120 to perform mirrored storage is not limited in this embodiment of this application.

If the front-end network adapter 114A of the first device 110 determines that the home node of the first target data is not the first device 110, the front-end network adapter 114A of the first device 110 may directly reject the data write request to the client device 200, for example, send, to the client device 200, a response used to indicate that the data cannot be written. The front-end network adapter 114A of the first device 110 may alternatively forward the first packet to the home node of the first target data. A manner in which the front-end network adapter 114A of the first device 110 sends the first packet is similar to the manner in which the front-end network adapter 114A of the first device 110 sends the mirror data write request. For details, refer to the foregoing descriptions. Details are not described herein again. For a process in which the home node of the first target data processes the first packet after receiving the first packet, refer to step 402 to step 409. Details are not described herein again. It should be noted that, after the home node of the first target data receives the first packet, a process of processing the first packet may be performed by a switch network adapter 114B of the home node.

Figure 5:
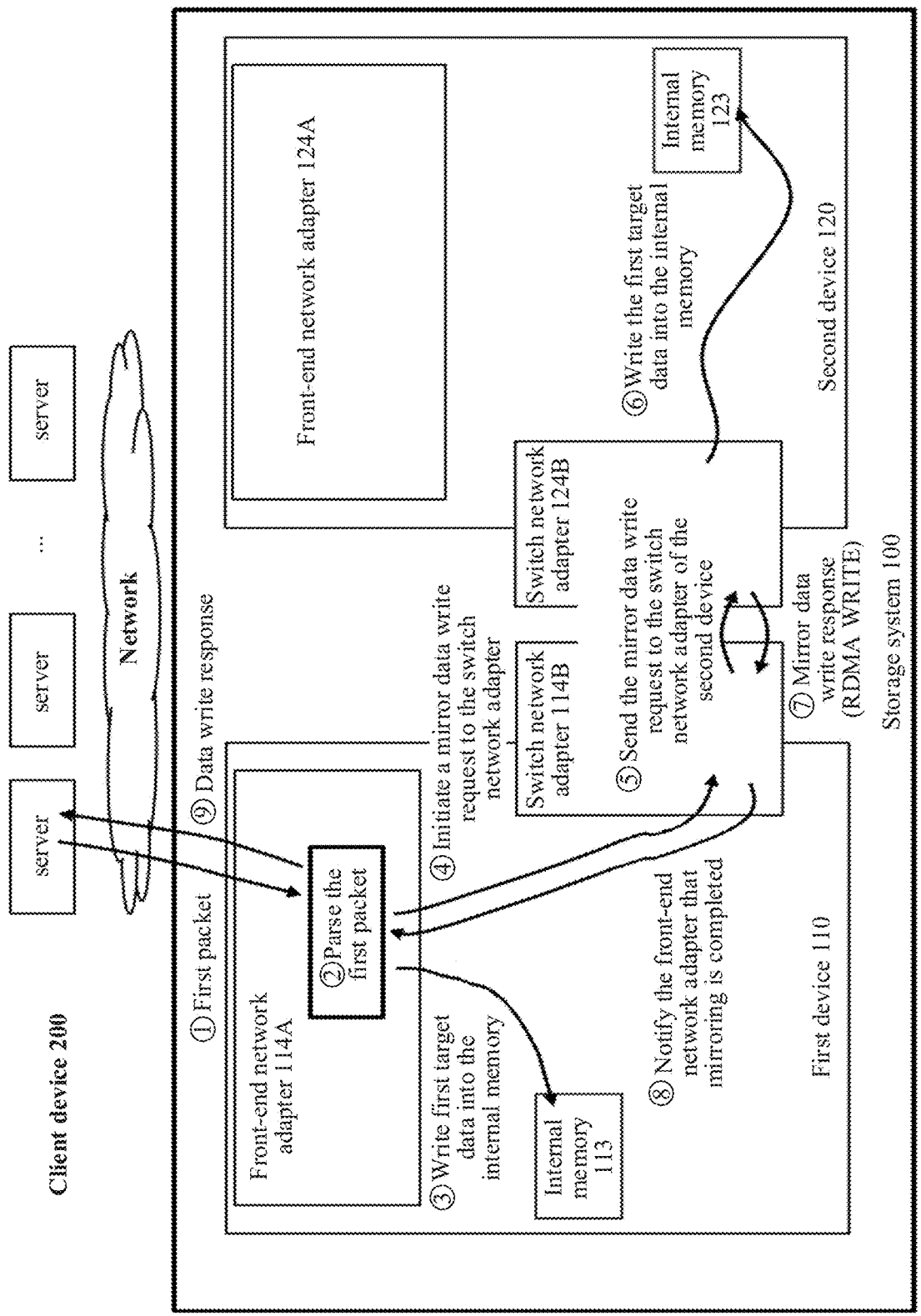
FIG. 5 is a schematic diagram of data transmission in a storage system based on a data read command according to this application.

FIG. 5 is a schematic diagram of data transmission in the storage system based on the data write command. The client device 200 may send the first packet to the first device 110 in the storage system through the network adapter. After the front-end network adapter 114A of the first device 110 receives the first packet, the second protocol acceleration module 114-1 may parse out the data write command from the first packet, and the first protocol acceleration module 114-2 may parse out the target data and the logical address of the target data from the data write command. The read/write module 114-4 may first store the target data in the internal memory 113 of the first device 110, and generate the metadata of the target data. The read/write module 114-4 sends the metadata of the target data to the index acceleration module 114-3. The index acceleration module 114-3 records the correspondence between the logical address of the target data and the metadata of the target data in the index information. The front-end network adapter 114A (such as the read/write module 114-4) of the first device 110 may further send the mirror data write command to the switch network adapter 114B of the first device 110. After receiving the mirror data write command, the switch network adapter 114B of the first device 110 may send the mirror data write command to the switch network adapter 124B of the second device 120. The mirror data write command may be exchanged between the switch network adapter 114B of the first device 110 and the switch network adapter 124B of the second device 120 based on the RDMA. After receiving the mirror data write command, the switch network adapter 124B of the second device 120 may store the target data in the internal memory 123 of the second device 120.

2. The Data Access Command is a Data Read Command.

Figure 6:
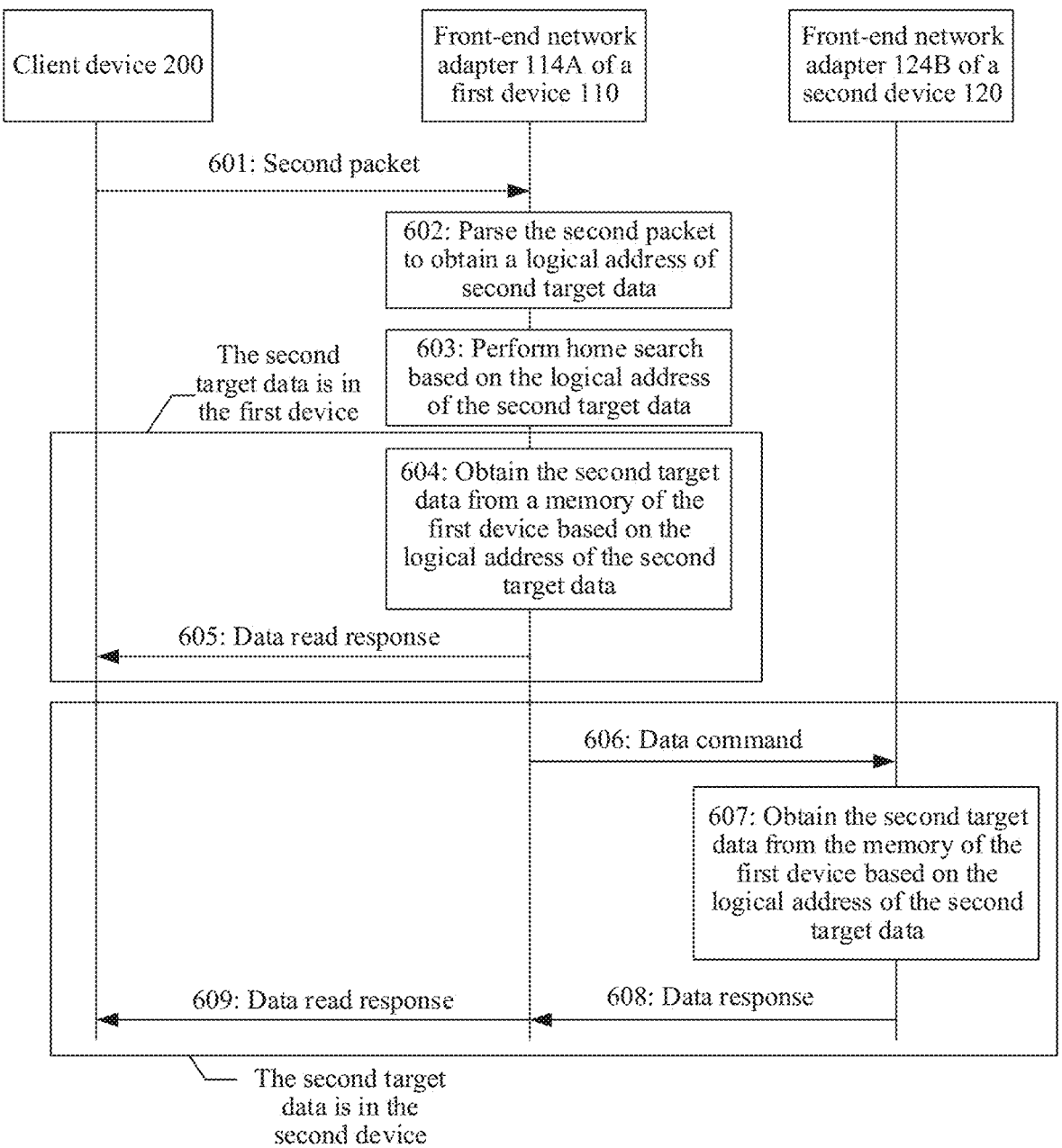
FIG. 6 is a schematic diagram of a data access method according to this application.

FIG. 6 shows a data access method according to an embodiment of this application. In the method, a front-end network adapter 114A of a first device 110 receives a data read command. In this method embodiment, the front-end network adapter 114A of the first device 110 can independently process the data read command, and a processor 112 of the first device 110 does not need to participate in the entire process. In other words, the front-end network adapter 114A of the first device 110 does not need to interact with the processor 112 of the first device 110, thereby shortening a data read time, improving data read efficiency, and reducing consumption of the processor 112 of the first device 110. The method includes:

Step 601: The front-end network adapter 114A of the first device 110 receives a second packet from a client device 200, where the second packet carries the data read command, and the data read command is for requesting to read second target data. The data read command carries a logical address of the second target data. For descriptions of the logical address of the second target data, refer to the related descriptions in step 301. Details are not described herein again.

Step 602: The front-end network adapter 114A of the first device 110 parses the second packet, and obtains the carried logical address of the second target data from the data read command.

For a manner in which the front-end network adapter 114A of the first device 110 parses the second packet and obtains the logical address of the second target data and the first target data, refer to the embodiment shown in FIG. 3A. Details are not described herein again.

Step 603: After obtaining the logical address of the second target data, the front-end network adapter 114A of the first device 110 performs home search based on the logical address of the second target data, to determine a home node of the second target data. The home search is to determine a device in which the second target data is located, and the device is the home node of the second target data. This step may be performed by an index acceleration module 114-3 in the front-end network adapter 114A of the first device 110. An execution manner of step 603 is similar to the execution manner of step 403. For details, refer to the foregoing content. Details are not described herein again.

A manner in which the front-end network adapter 114A of the first device 110 performs home search is not limited in this embodiment of this application. The following lists two manners:

The front-end network adapter 114A of the first device 110 determines whether the home node of the second target data is the first device 110. If the home node of the second target data is the first device 110, the front-end network adapter 114A of the first device 110 performs steps 604 to 605. If the home node of the second target data is not the first device 110, for example, the home node of the second target data is a second device 120, the front-end network adapter 114A of the first device 110 may perform steps 606 to 609.

Step 604: The front-end network adapter 114A of the first device 110 obtains the second target data from a memory of the first device 110 based on the logical address of the second target data.

In a process in which the front-end network adapter 114A of the first device 110 obtains the second target data from the memory of the first device 110 based on the logical address of the second target data, the front-end network adapter 114A of the first device 110 searches for index information based on the logical address of the second target data, to obtain second metadata of the second target data.

When the index information directly records a correspondence between the logical address of the data and the second metadata of the data, the front-end network adapter 114A of the first device 110 (for example, the index acceleration module 114-3 in the front-end network adapter 114A of the first device 110) may directly search for the second metadata corresponding to the logical address of the data or an address of the second metadata in the index information. If the front-end network adapter 114A of the first device 110 obtains the address of the second metadata, the front-end network adapter 114A of the first device 110 (for example, the index acceleration module 114-3 in the front-end network adapter 114A of the first device 110) may obtain the second metadata based on the address of the second metadata.

After the front-end network adapter 114A of the first device 110 obtains the second metadata, the front-end network adapter 114A of the first device 110 may determine a physical address of the second target data based on the second metadata, and obtain the second target data based on the physical address of the second target data.

When the second target data is stored in an internal memory 113 of the first device 110, the front-end network adapter 114A of the first device 110 may directly read the second target data from the internal memory 113 of the first device 110. When the second target data is stored in a hard disk 115 of the first device 110, the front-end network adapter 114A of the first device 110 may directly read the second target data from the hard disk 115 of the first device 110, or may transfer the second target data from the hard disk 115 of the first device 110 to the internal memory 113 of the first device 110, and then read the second target data from the internal memory 113 of the first device 110.

Specifically, in the front-end network adapter 114A of the first device 110, the index acceleration module 114-3 may obtain the second metadata of the second target data based on the logical address of the second target data, and the index acceleration module 114-3 obtains the second metadata of the second target data from the maintained index information based on the logical address of the second target data. If the correspondence between the logical address of the data and the metadata of the data is recorded in the index information in a direct manner, the index acceleration module 114-3 may directly obtain the second metadata of the second target data or the address of the second metadata from the maintained index information based on the logical address of the second target data. If the correspondence between the logical address of the data and the metadata of the data is recorded in the index information in an indirect manner, for example, in a key-value pair manner, the index acceleration module 114-3 may perform hashing on the logical address of the second target data to obtain a key, and then obtain the second metadata of the second target data or the address of the second metadata from the maintained index information based on the key.

After obtaining the second metadata, the index acceleration module 114-3 sends the second metadata to a read/write module 114-4. Then, the read/write module 114-4 reads the second target data from the first device 110 based on the second metadata (for that the read/write module 114-4 reads the second target data from the first device 110 based on the second metadata, refer to the foregoing descriptions of the front-end network adapter 114A reading the first target data, and details are not described herein again).

Step 605: After obtaining the second target data, the front-end network adapter 114A of the first device 110 feeds back a data read response to the client device 200, where the data read response carries the second target data.

Step 606: If the home node of the second target data is the second device 120, the front-end network adapter 114A of the first device 110 obtains the second target data from the second device 120.

If the front-end network adapter 114A of the first device 110 determines that the home node of the second target data is the second device 120, the front-end network adapter 114A of the first device 110 may directly interact with the second device 120 (for example, a network adapter 124 of the second device 120), and the processor 112 of the first device 110 does not need to participate.

The front-end network adapter 114A of the first device 110 may process the data read command, and send a processed data read command to the network adapter 114 of the second device 120. The network adapter 114 of the second device 120 may be a switch network adapter 114B of the second device 120.

A process in which the front-end network adapter 114A of the first device 110 obtains the second target data from the second device 120 includes the following steps:

Step 1: The front-end network adapter 114A of the first device 110 may process the data read command, to generate a data command that needs to be transmitted to the second device 120.

The processing performed by the front-end network adapter 114A of the first device 110 on the data read command includes: updating a destination address of the data read command to an address of the second device 120, and including an address of the first device 110 in the data read command. There are many manners of including the address of the first device 110 in the data read command. For example, a source address of the data read command may be updated to the address of the first device 110. For another example, the address of the first device 110 is written into an IB valid payload of the data read command.

Step 2: The front-end network adapter 114A of the first device 110 then sends the data command to the switch network adapter 114B of the second device 120.

When the front-end network adapter 114A of the first device 110 sends the data command to the switch network adapter 114B of the second device 120, if there are a plurality of switch network adapters 114B in the first device 110 that are connected to the second device 120, the front-end network adapter 114A of the first device 110 may further select a switch network adapter 114B from the plurality of switch network adapters 114B, and send the processed data read command to the selected switch network adapter 114B. Then, the selected switch network adapter 114B sends the processed data read command to the switch network adapter 124B of the second device 120 based on the destination address of the data read command.

A manner in which the front-end network adapter 114A of the first device 110 selects a switch network adapter 114B from the plurality of switch network adapters 114B is not limited in this embodiment of this application. For example, the front-end network adapter 114A of the first device 110 may randomly select one of the switch network adapters 114B. For another example, the front-end network adapter 114A of the first device 110 may select one switch network adapter 114B from the plurality of switch network adapters 114B based on a load balancing policy.

It should be noted that, when a data volume of the second target data is large, the front-end network adapter 114A of the first device 110 may divide the second target data into a plurality of pieces of small sub-data, and the front-end network adapter of the first device 110 may generate a plurality of data commands, where each data command carries one piece of sub-data. The front-end network adapter 114A of the first device 110 may send the plurality of data commands to the switch network adapter 114B of the second device 120. If there are a plurality of switch network adapters 114B in the first device 110 connected to the second device 120, the front-end network adapter 114A of the first device 110 may select one switch network adapter 114B from the plurality of switch network adapters 114B to send the plurality of data commands.

Step 3: After receiving the data command, the switch network adapter 124B of the second device 120 obtains the second target data from a memory of the second device 120 based on the logical address that is of the second target data and that is carried in the data command.

A manner in which the switch network adapter 124B of the second device 120 obtains the second target data from the memory of the second device 120 based on the logical address that is of the second target data and that is carried in the data command is similar to the manner in which the front-end network adapter 114A of the first device 110 obtains the second target data from the memory of the second device 110 based on the logical address that is of the second target data and that is carried in the data read command in step 604. For details, refer to the foregoing descriptions. Details are not described herein again.

Step 4: After obtaining the second target data, the switch network adapter 114B of the second device 120 may send a data response to the switch network adapter 114B of the first device 110, where the data response carries the second target data. A destination address of the data response is the address of the first device 110.

Step 5: The switch network adapter 114B of the first device 110 parses the data response, obtains the second target data from the data response, and sends the second target data to the front-end network adapter 114A of the first device 110.

After obtaining the second target data, the front-end network adapter 114A of the first device 110 may perform step 607.

Step 607: After obtaining the second target data, the front-end network adapter 114A of the first device 110 feeds back the data read response to the client device 200, where the data read response carries the second target data.

Figure 7:
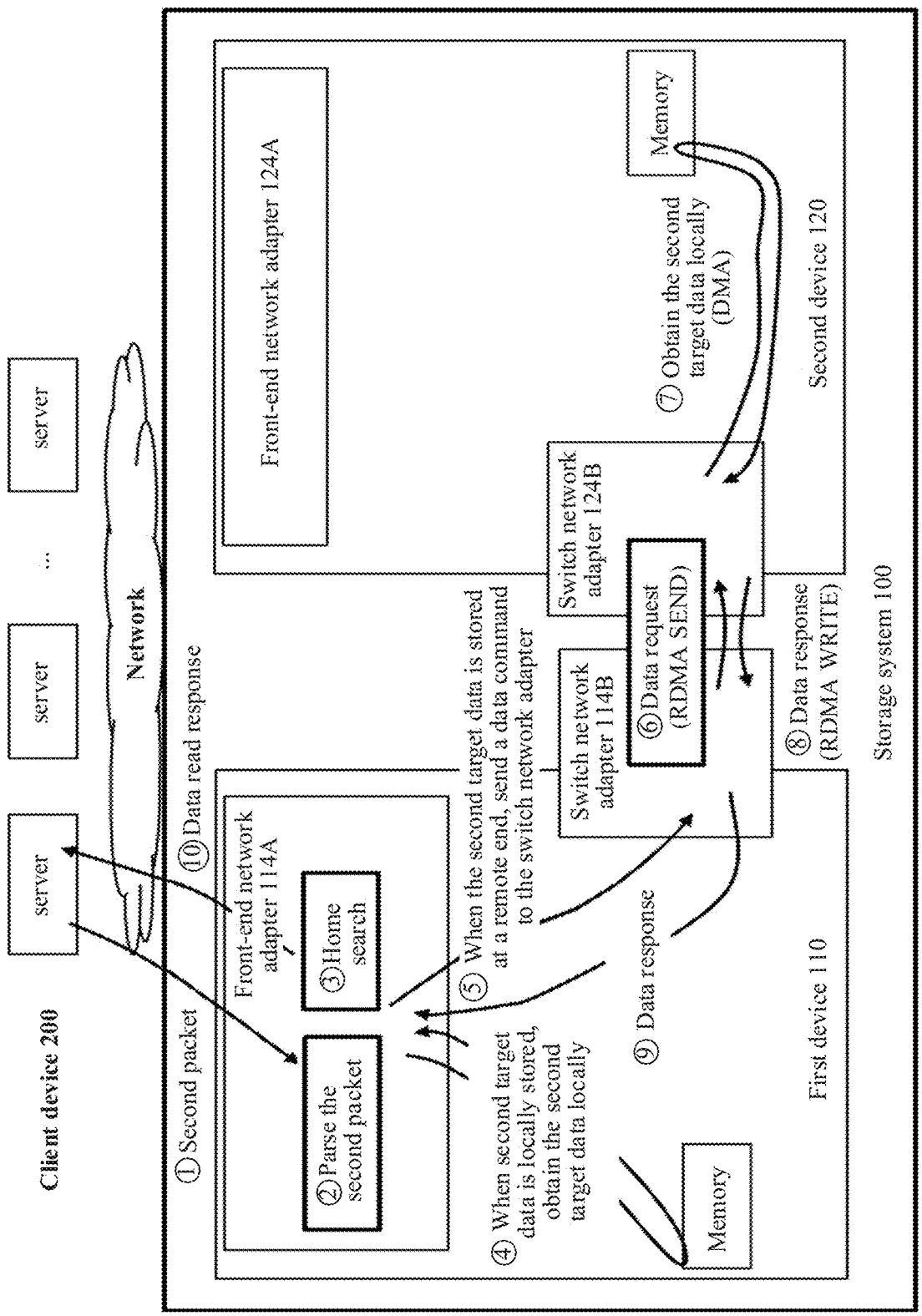
FIG. 7 is a schematic diagram of data transmission in a storage system based on a data write command according to this application.

FIG. 7 is a schematic diagram of data transmission in a storage system based on the data write command. The client device 200 may send the second packet to the first device 110 in the storage system through the network adapter. After receiving the second packet, the front-end network adapter 114A of the first device 110 parses the second packet. Specifically, in the front-end network adapter 114A of the first device 110, a second protocol acceleration module 114-1 may parse out data read command from the second packet. A first protocol acceleration module 114-2 may parse out the logical address of the second target data from the data read command. Then, the index acceleration module 114-3 in the front-end network adapter 114A of the first device 110 may determine the home node of the second target data. If the home node of the second target data is the first device 110, that is, the second target data is stored locally, a read module in the front-end network adapter 114A of the first device 110 may obtain the second target data from a local memory (for example, the internal memory 113 of the first device 110 or the hard disk 115 of the first device 110). The front-end network adapter 114A of the first device 110 may obtain the second target data from the local memory based on direct memory access (direct memory access, DMA). If the home node of the second target data is the second device 120, that is, the second target data is stored at a remote end, the read module in the front-end network adapter 114A of the first device 110 may generate the data command based on the data read command, and send the data command to the switch network adapter 114B of the first device 110. After receiving the data command, the switch network adapter 114B of the first device 110 may send the data command to the switch network adapter 124B of the second device 120. The switch network adapter 114B of the first device 110 may send the data command to the switch network adapter 124B of the second device 120 by an RDMA SEND operation. After obtaining the data command, the switch network adapter 124B of the second device 120 may obtain the second target data from a local memory (for example, an internal memory 123 of the second device 120 or a hard disk 115 of the second device 120). The switch network adapter 114B of the second device 120 may directly obtain the second target data from the local memory based on the DMA. After obtaining the second target data, the switch network adapter 114B of the second device 120 may feed back, to the switch network adapter 114B of the first device 110, the data response that carries the second target data. After receiving the data response, the switch network adapter 114B of the first device 110 may send the second target data to the front-end network adapter 114A of the first device 110. The front-end network adapter 114A of the first device 110 may feed back the data read response to the client device 200, where the data read response carries the second target data. The front-end network adapter 114A of the first device 110 may feed back the data read response to the client device 200 by an RDMA two-sided operation (for example, an RDMA WRITE operation).

Figure 8:
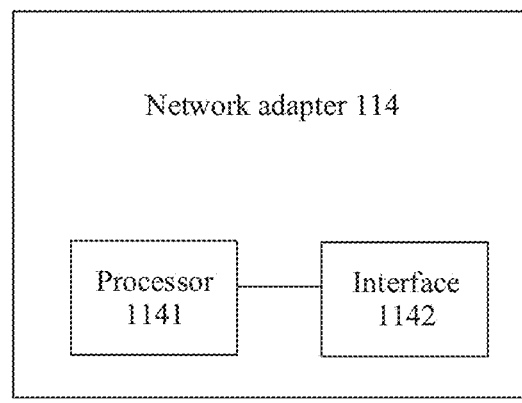
FIG. 8 is a schematic diagram of a structure of a network adapter according to this application.

Based on a same inventive concept as that of the method embodiments, an embodiment of this application further provides a network adapter. The network adapter is configured to perform the methods performed by the front-end network adapter 114A or the network adapter 114 of the first device 110 in the method embodiments shown in FIG. 3A, FIG. 4, FIG. 5, FIG. 6, and FIG. 7. For related features, refer to the foregoing method embodiments. Details are not described herein again. As shown in FIG. 8, the network adapter 114 includes a processor 1141 and an interface 1142. For a specific form of the processor 1141, refer to the related descriptions of the processor 112. Details are not described herein again. Due to existence of the processor 1141, a front-end network adapter 114A or a network adapter 114 has a capability of performing the method performed by the front-end network adapter 114A or the network adapter 114 of the first device 110 in the method embodiments shown in FIG. 3A, FIG. 4, FIG. 5, FIG. 6, and FIG. 7. The processor 1141 may further send or receive information through the interface 1142, for example, receive a first packet or a second packet, or send a data access response or a mirror data write command.

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, all or some of the procedures or functions according to embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium, or the like. The semiconductor medium may be a solid-state drive (solid-state drive, SSD).

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) including computer-usable program code.

This application is described with reference to the flowcharts and/or block diagrams of the method, the device (system), and the computer program product according to this application. It should be understood that, computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These computer program instructions may alternatively be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It is clearly that, a person skilled in the art can make various modifications and variations to this application without departing from the scope of this application. In this case, if the modifications and variations made to this application fall within the scope of the claims of this application and equivalent technologies thereof, this application is intended to cover these modifications and variations.

What is claimed is:

1. A first storage device comprising a front-end network adapter, wherein the front-end network adapter comprises:
   at least one processor; and
   one or more memories coupled to the at least one processor and storing programming instructions for execution by the at least one processor to:
      receive a first packet from a client device, wherein the first packet is for requesting to write first target data into the first storage device;
      obtain a logical address of the first target data from the first packet;
      write the first target data into the first storage device;
      generate metadata;
      record a relationship between the logical address of the first target data and the metadata, wherein the metadata indicates a physical address at which the first target data is stored in the first storage device;
      send a mirror data write command to a second storage device, wherein the mirror data write command is for requesting to write a copy of the first target data, and the mirror data write command comprises the copy of the first target data and the logical address of the first target data;
      receive a second packet comprising a data read command, the data read command comprising a logical address of second target data;
      determine, based on the logical address of the second target data, whether a home node of the second target data is the first storage device;
      in response to determining that the home node of the second target data is not the first storage device, send the data read command to the second storage device; and
      receive the second target data from the second storage device.

2. The first storage device according to claim 1, wherein the first storage device comprises an internal memory, and the internal memory stores index information, and wherein the programming instructions are for execution by the at least one processor to:
   create a correspondence between a key and a value in the index information, wherein the value is the metadata or an address of the metadata, and the key is determined based on the logical address of the first target data.

3. The first storage device according to claim 1, wherein the programming instructions are for execution by the at least one processor to:
   receive the first packet;
   parse the first packet to obtain a data write command based on a remote direct memory access (RDMA) protocol; and
   parse the data write command to obtain the logical address that is of the first target data and that is carried in the data write command.

4. The first storage device according to claim 1, wherein the first packet is based on any one of the following protocols:
   infiniband (IB), remote direct memory access over converged Ethernet (ROCE), and an Internet wide area remote direct memory access protocol (iWARP).

5. The first storage device according to claim 1, wherein the first storage device comprises at least two switch network adapters, the first storage device is connected to the second storage device through the at least two switch network adapters, and the programming instructions are for execution by the at least one processor to:
   select a switch network adapter from the at least two switch network adapters based on a load balancing policy; and
   send the mirror data write command to the second storage device through the selected switch network adapter.

6. The first storage device according to claim 5, wherein the front-end network adapter of the first storage device and the switch network adapters of the first storage device are deployed in a centralized manner.

7. The first storage device according to claim 1, wherein the programming instructions are for execution by the at least one processor to:
   receive a third packet from the client device to read the first target data, wherein the third packet comprises the logical address of the first target data;
   obtain the metadata based on the logical address of the first target data; and
   obtain the first target data from the first storage device based on the metadata.

8. The first storage device according to claim 7, wherein the programming instructions are for execution by the at least one processor to:
   receive the third packet;
   parse the third packet to obtain an additional data read command based on a RDMA protocol; and
   parse the additional data read command to obtain the logical address that is of the first target data and that is carried in the additional data read command.

9. The first storage device according to claim 7, wherein before obtaining the metadata based on the logical address of the first target data, the programming instructions are for execution by the at least one processor to:
   determine, based on the logical address of the first target data, that a home node of the first target data is the first storage device.

10. A data access method, comprising:
    receiving, by a front-end network adapter of a first storage device, a first packet from a client device, wherein the first packet is for requesting to write first target data into the first storage device;
    obtaining, by the front-end network adapter of the first storage device, a logical address of the first target data from the first packet;
    writing the first target data into the first storage device;
    generating metadata;
    recording a relationship between the logical address of the first target data and the metadata, wherein the metadata describes a physical address at which the first target data is stored in the first storage device;
    sending, by the front-end network adapter of the first storage device, a mirror data write command to a second storage device, wherein the mirror data write command is for requesting to write a copy of the first target data, and the mirror data write command comprises the copy of the first target data and the logical address of the first target data;

receiving a second packet comprising a data read command, the data read command comprising a logical address of second target data;

determining, based on the logical address of the second target data, whether a home node of the second target data is the first storage device;

in response to determining that the home node of the second target data is not the first storage device, sending the data read command to the second storage device; and receiving the second target data from the second storage device.

11. The method according to claim 10, wherein the recording a relationship between the logical address of the first target data and the metadata comprises:

creating, by the front-end network adapter of the first storage device, a correspondence between a key and a value in index information in an internal memory of the first storage device, wherein the value is the metadata or an address of the metadata, and the key is determined based on the logical address of the first target data.

12. The method according to claim 10, wherein the obtaining, by the front-end network adapter of the first storage device, a logical address of the first target data from the first packet comprises:

parsing, by the front-end network adapter of the first storage device, the first packet to obtain a data write command based on a remote direct memory access (RDMA) protocol; and parsing, by the front-end network adapter of the first storage device, the data write command to obtain the logical address that is of the first target data and that is carried in the data write command.

13. The method according to claim 10, wherein the first storage device comprises at least two switch network adapters, the first storage device is connected to the second storage device through the at least two switch network adapters, and the sending, by the front-end network adapter of the first storage device, a mirror data write command to the second storage device comprises:

selecting, by the front-end network adapter of the first storage device, a switch network adapter from the at least two switch network adapters based on a load balancing policy; and sending, by the front-end network adapter of the first storage device, the mirror data write command to the second storage device through the selected switch network adapter.

14. The method according to claim 10, further comprising:

receiving, by the front-end network adapter of the first storage device, a third packet from the client device, wherein the third packet is for requesting to read the first target data;

obtaining, by the front-end network adapter of the first storage device, the logical address of the first target data from the third packet;

obtaining, by the front-end network adapter of the first storage device, the metadata based on the logical address of the first target data, wherein the metadata is for describing the physical address at which the first target data is stored in the first storage device; and obtaining, by the front-end network adapter of the first storage device, the first target data from the first storage device based on the metadata.

15. A network adapter as a front-end network adapter of a first storage device, comprises:

an interface, configured to perform data transmission;

at least one processor; and one or more memories coupled to the at least one processor and storing programming instructions for execution by the at least one processor to:

receive a first packet from a client device, wherein the first packet is for requesting to write first target data into the first storage device;

obtain a logical address of the first target data from the first packet;

write the first target data into the first storage device;

generate metadata;

record a relationship between the logical address of the first target data and the metadata, wherein the metadata describes a physical address at which the first target data is stored in the first storage device;

send a mirror data write command to a second storage device, wherein the mirror data write command is for requesting to write a copy of the first target data, and the mirror data write command comprises the copy of the first target data and the logical address of the first target data;

receive a second packet comprising a data read command, the data read command comprising a logical address of second target data;

determine, based on the logical address of the second target data, whether a home node of the second target data is the first storage device;

in response to determining that the home node of the second target data is not the first storage device, send the data read command to the second storage device; and receive the second target data from the second storage device.

16. The network adapter according to claim 15, wherein the programming instructions are for execution by the at least one processor to:

create a correspondence between a key and a value in index information in an internal memory of the first storage device, wherein the value is the metadata or an address of the metadata, and the key is determined based on the logical address of the first target data.

17. The network adapter according to claim 15, wherein the programming instructions are for execution by the at least one processor to:

parse the first packet to obtain a data write command based on a remote direct memory access (RDMA) protocol; and parse the data write command to obtain the logical address that is of the first target data and that is carried in the data write command.

18. The network adapter according to claim 15, wherein the first storage device comprises at least two switch network adapters, the first storage device is connected to the second storage device through the at least two switch network adapters, and the programming instructions are for execution by the at least one processor to:

select a switch network adapter from the at least two switch network adapters based on a load balancing policy; and send the mirror data write command to the second storage device through the selected switch network adapter.

19. The network adapter according to claim 15, wherein the programming instructions are for execution by the at least one processor to:
- receive a third packet from the client device to read the first target data, wherein the third packet comprises the logical address of the first target data;
- obtain the metadata based on the logical address of the first target data; and
- obtain the first target data from the first storage device based on the metadata.

20. The network adapter according to claim 19, wherein the programming instructions are for execution by the at least one processor to:
- receive the third packet;
- parse the third packet to obtain an additional data read command based on a RDMA protocol; and
- parse the additional data read command to obtain the logical address that is of the first target data and that is carried in the additional data read command.

* * * * *